US012172218B2

(12) United States Patent
Stjernstedt et al.

(10) Patent No.: US 12,172,218 B2
(45) Date of Patent: Dec. 24, 2024

(54) TURNING METHOD FOR A CNC-LATHE AND A TURNING TOOL

(71) Applicant: AB SANDVIK COROMANT, Sandviken (SE)

(72) Inventors: Per-Anders Stjernstedt, Gavle (SE); Henrik Loikkanen, Jarbo (SE)

(73) Assignee: AB Sandvik Coromant, Sandviken (SE)

( * ) Notice: Subject to any disclaimer, the term of this patent is extended or adjusted under 35 U.S.C. 154(b) by 1110 days.

(21) Appl. No.: 16/978,818

(22) PCT Filed: Jan. 29, 2019

(86) PCT No.: PCT/EP2019/052097
§ 371 (c)(1),
(2) Date: Sep. 8, 2020

(87) PCT Pub. No.: WO2019/170326
PCT Pub. Date: Sep. 12, 2019

(65) Prior Publication Data
US 2021/0046551 A1   Feb. 18, 2021

(30) Foreign Application Priority Data

Mar. 8, 2018  (EP) .................................... 18160706
Mar. 8, 2018  (EP) .................................... 18160713
Oct. 25, 2018 (EP) .................................... 18202649

(51) Int. Cl.
*B23B 1/00*  (2006.01)
*B23B 27/16* (2006.01)
*B23Q 15/12* (2006.01)

(52) U.S. Cl.
CPC ............... *B23B 1/00* (2013.01); *B23B 27/16* (2013.01); *B23Q 15/12* (2013.01)

(58) Field of Classification Search
CPC .. B23B 1/00; B23B 3/26; B23B 3/265; B23B 3/36; B23B 29/043; B23B 29/04;
(Continued)

(56) References Cited

U.S. PATENT DOCUMENTS 3,128,657 A    4/1964  Hebert
3,744,357 A *  7/1973  Anderson ............... B23B 29/10
                                              82/12
(Continued)

FOREIGN PATENT DOCUMENTS

DE    102008049515 A1 *  4/2010  ............... B23B 1/00
DE    102015216203 A1     3/2017
(Continued)

OTHER PUBLICATIONS

Drozda et al., Tool and Manufacturing Engineers Handbook, 1983, Society of Manufacturing Engineers, vol. 1, Fourth Edition, Chapter 8, pp. 8-2; 8-64 to 8-68 (Year: 1983).*
(Continued)

*Primary Examiner* — Nicole N Ramos
(74) *Attorney, Agent, or Firm* — Corinne R. Gorski

(57) ABSTRACT

A turning method for a computerized numerical control lathe includes providing a turning tool having a cutting portion, the cutting portion including a first nose portion, the first nose portion including a first cutting edge, a second cutting edge, and a convex nose cutting edge connecting the first and second cutting edges, wherein the first and second cutting edges are straight or substantially straight in a top view. The method further includes providing a metal work piece, rotating the metal work piece around a work piece rotational axis, and making a first pass where the first cutting edge is active and the second cutting edge is inactive. A first machined surface is generated by the convex nose cutting edge, and during at least a portion of the first pass, an
(Continued)

entering angle and an angle, which the first cutting edge forms with the work piece rotational axis, simultaneously varies.

16 Claims, 16 Drawing Sheets

(58) Field of Classification Search
CPC .......... B23B 2210/02; B23B 2200/048; B23B 2200/0495; B23B 2200/049; B23B 2220/12; B23B 2220/00; B23B 2220/44; B23B 2220/445; B23B 2220/40; B23B 2270/54

See application file for complete search history.

(56) References Cited

U.S. PATENT DOCUMENTS

| | | | | |
|---|---|---|---|---|
| 4,213,356 A * | 7/1980 | Armitage | ................. | B23B 5/14 |
| | | | | 82/149 |
| 4,572,042 A | 2/1986 | Wiman | | |
| 4,907,665 A | 3/1990 | Kar et al. | | |
| 6,457,391 B1 * | 10/2002 | Yamazaki | ............ | G05B 19/182 |
| | | | | 82/1.5 |
| 6,715,386 B2 * | 4/2004 | Maier | ................. | B23B 29/24 |
| | | | | 82/159 |
| 7,416,372 B2 * | 8/2008 | Hyatt | ................. | B23B 1/00 |
| | | | | 407/65 |
| 8,469,458 B2 | 6/2013 | Bechem et al. | | |
| 10,493,534 B2 * | 12/2019 | Klose | ................. | B23Q 1/64 |
| 10,814,401 B2 * | 10/2020 | Fukuyama | ............ | B23B 27/22 |
| 2002/0061235 A1 | 5/2002 | Maier | | |
| 2002/0123823 A1 * | 9/2002 | Harada | ............ | G05B 19/4093 |
| | | | | 700/192 |
| 2002/0170396 A1 | 11/2002 | Maier | | |
| 2003/0143047 A1 * | 7/2003 | Ishii | ................. | B23C 5/10 |
| | | | | 407/53 |
| 2005/0019113 A1 * | 1/2005 | Wermeister | ......... | B23B 27/1614 |
| | | | | 407/113 |
| 2009/0182451 A1 * | 7/2009 | Jennessen | ........ | G05B 19/40938 |
| | | | | 82/118 |
| 2011/0142562 A1 * | 6/2011 | Sturges | ................. | B23Q 39/02 |
| | | | | 29/27 A |
| 2018/0029134 A1 | 2/2018 | Klose | | |
| 2020/0324345 A1 * | 10/2020 | Maier | ................. | B23B 29/04 |

FOREIGN PATENT DOCUMENTS

| | | | | |
|---|---|---|---|---|
| EP | 0090658 A3 | 10/1983 | | |
| EP | 699495 A1 * | 3/1996 | ............. | B23C 5/109 |
| EP | 1415742 A1 | 5/2004 | | |
| EP | 2087956 A1 * | 8/2009 | ............... | B23B 1/00 |
| EP | 3153260 A1 | 4/2017 | | |
| GB | 2184383 A | 6/1987 | | |
| JP | H06277901 A | 10/1994 | | |

OTHER PUBLICATIONS

Excerpt from Sandvik Coromant's "Metalcutting Technical Guide" 2005, Chapter G Tool Holding Systems, pp. G1-G9.
Excerpt from Sandvik Coromant's "Metalcutting Technical Guide" 2005, Chapter G Tool Holding Systems, pp. G10-G15.
Excerpt from Sandvik Coromant's "Metalcutting Technical Guide" 2005, Chapter G Tool Holding Systems, pp. G16-G21.
Excerpt from Sandvik Coromant's "Metalcutting Technical Guide" 2005, Chapter G Tool Holding Systems, pp. G22-G30.
Excerpt from Sandvik Coromant's "Metalcutting Technical Guide" 2005, Chapter G Tool Holding Systems, pp. G31-G35.
Sandvik Coromant, Quick change for CNC-Lathes-User's guide, Dec. 2017.
Sandvik Coromant, "Machine Integration-Coromant Capto", Jun. 2010.

* cited by examiner

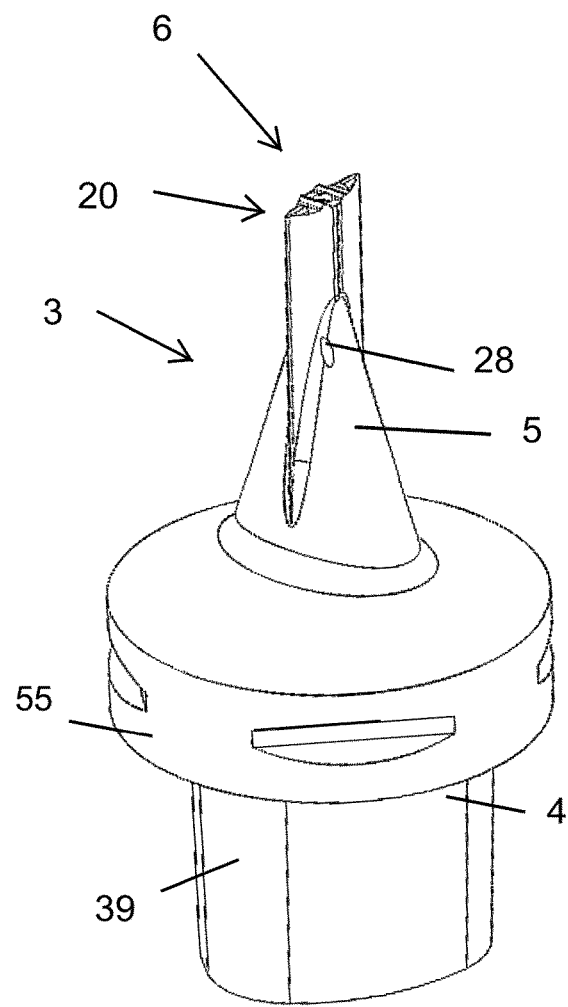
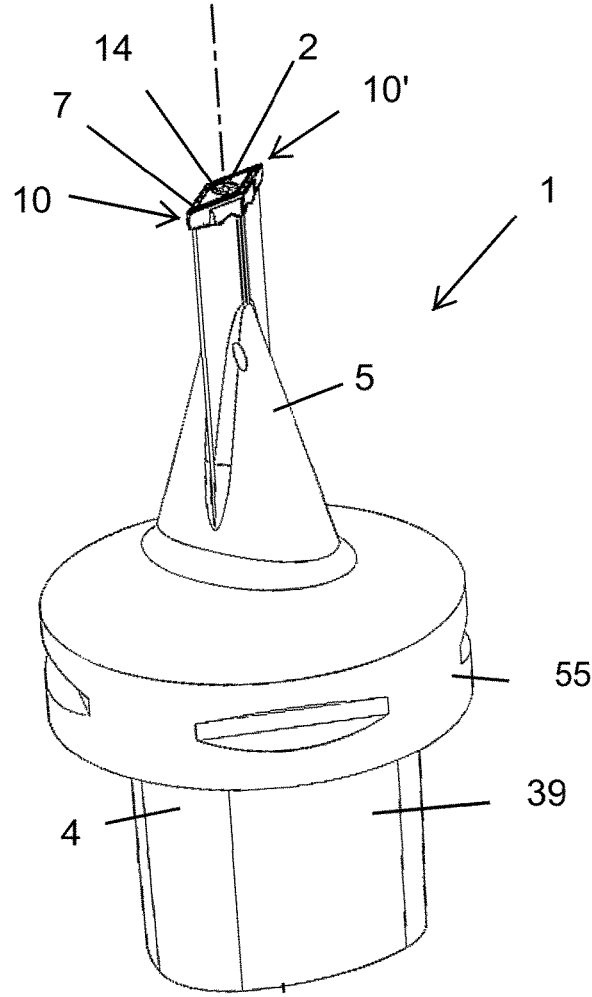
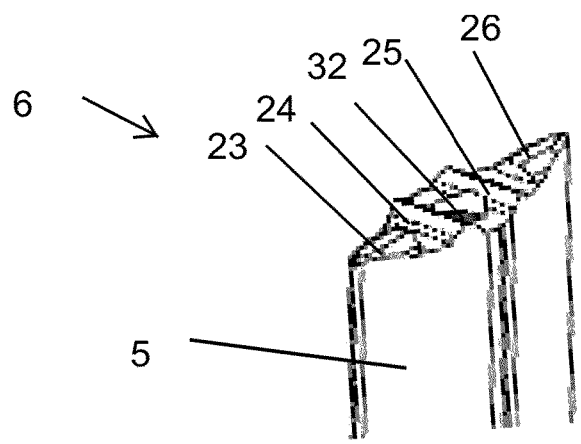
Fig. 1
Fig. 2
Fig. 3

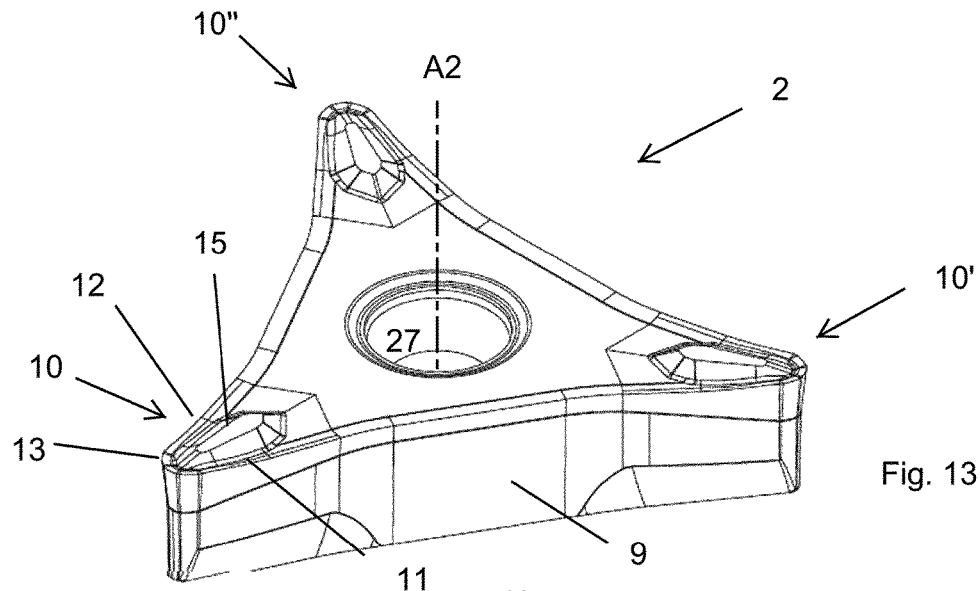
Fig. 13
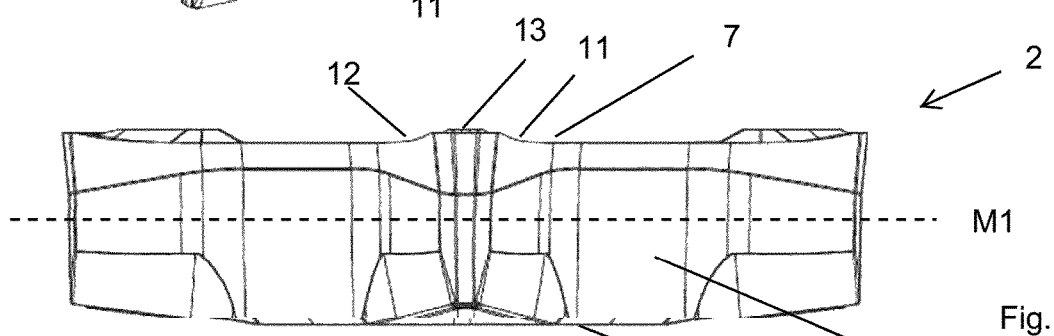
Fig. 14
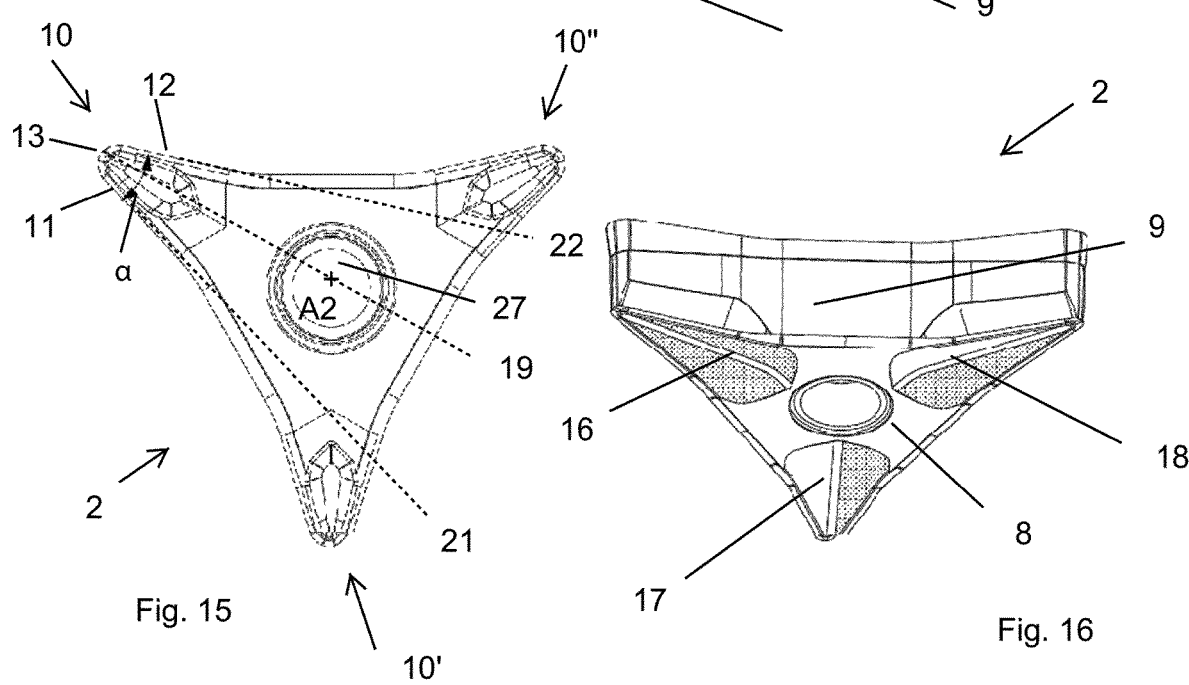
Fig. 15
Fig. 16

R2 ---·---·---·---·---

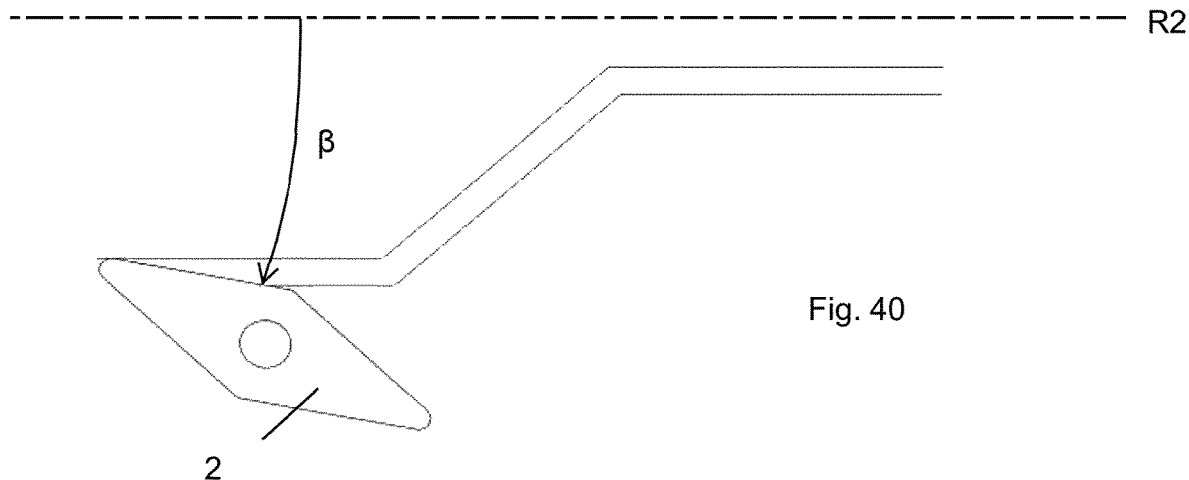
Fig. 40
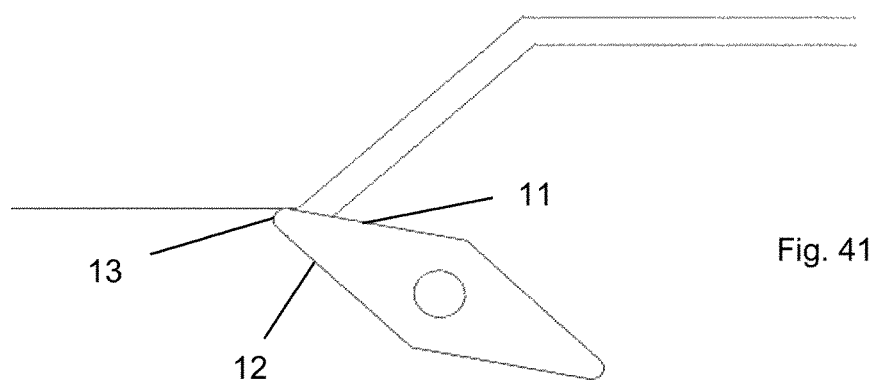
Fig. 41
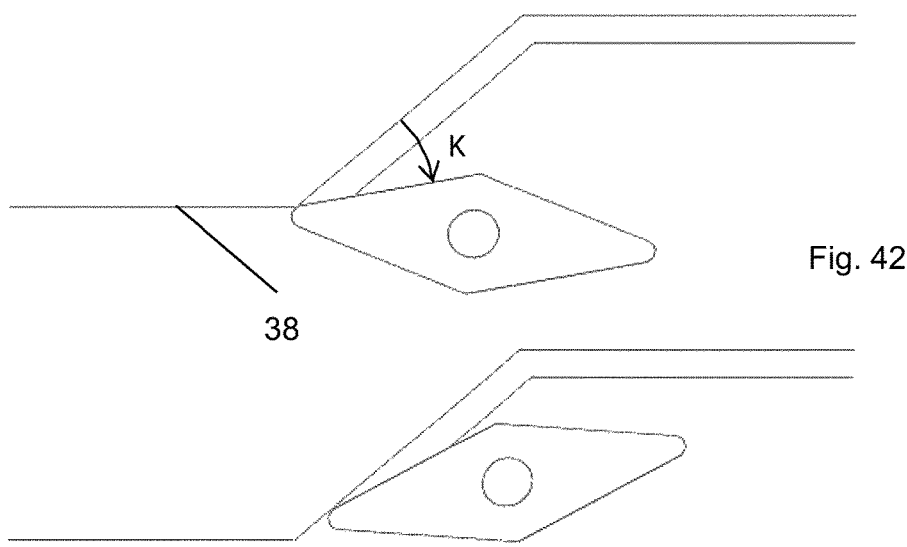
Fig. 42
Fig. 43

38

38

Fig. 53  Fig. 54  Fig. 55
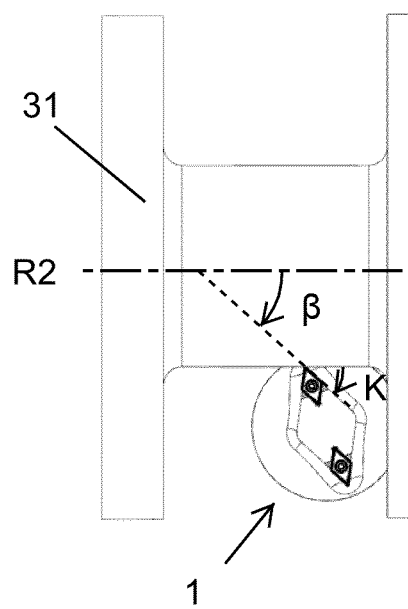
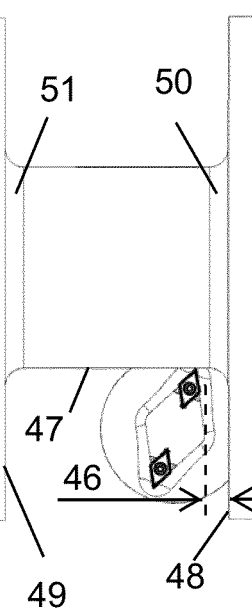
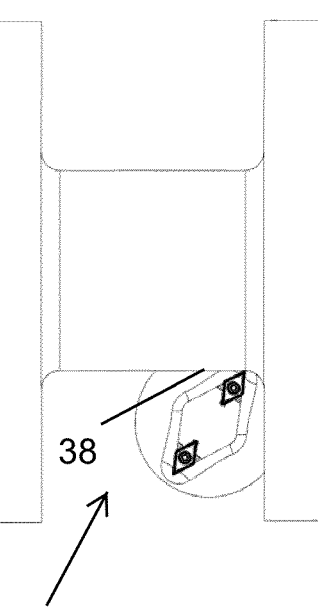
Fig. 56  Fig. 57  Fig. 58
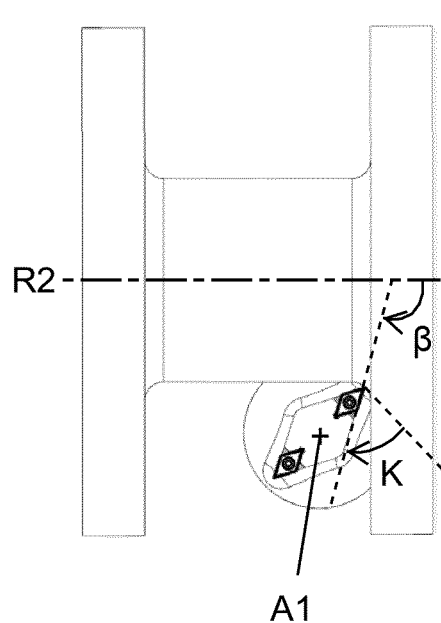
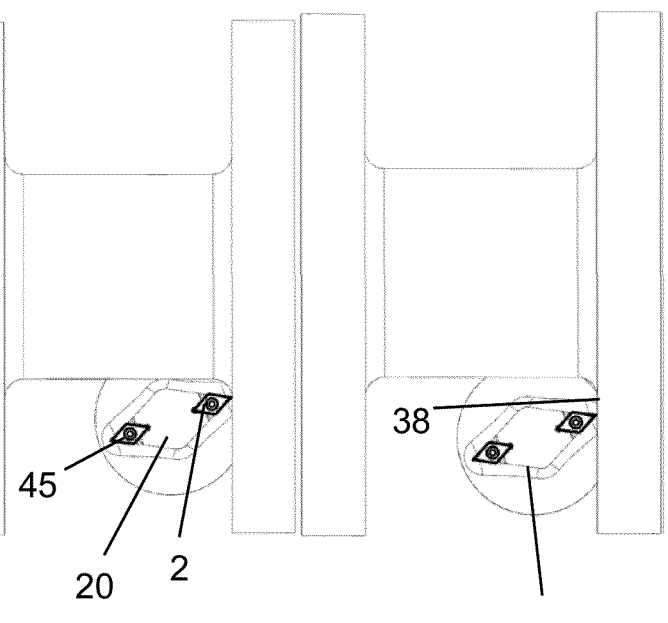

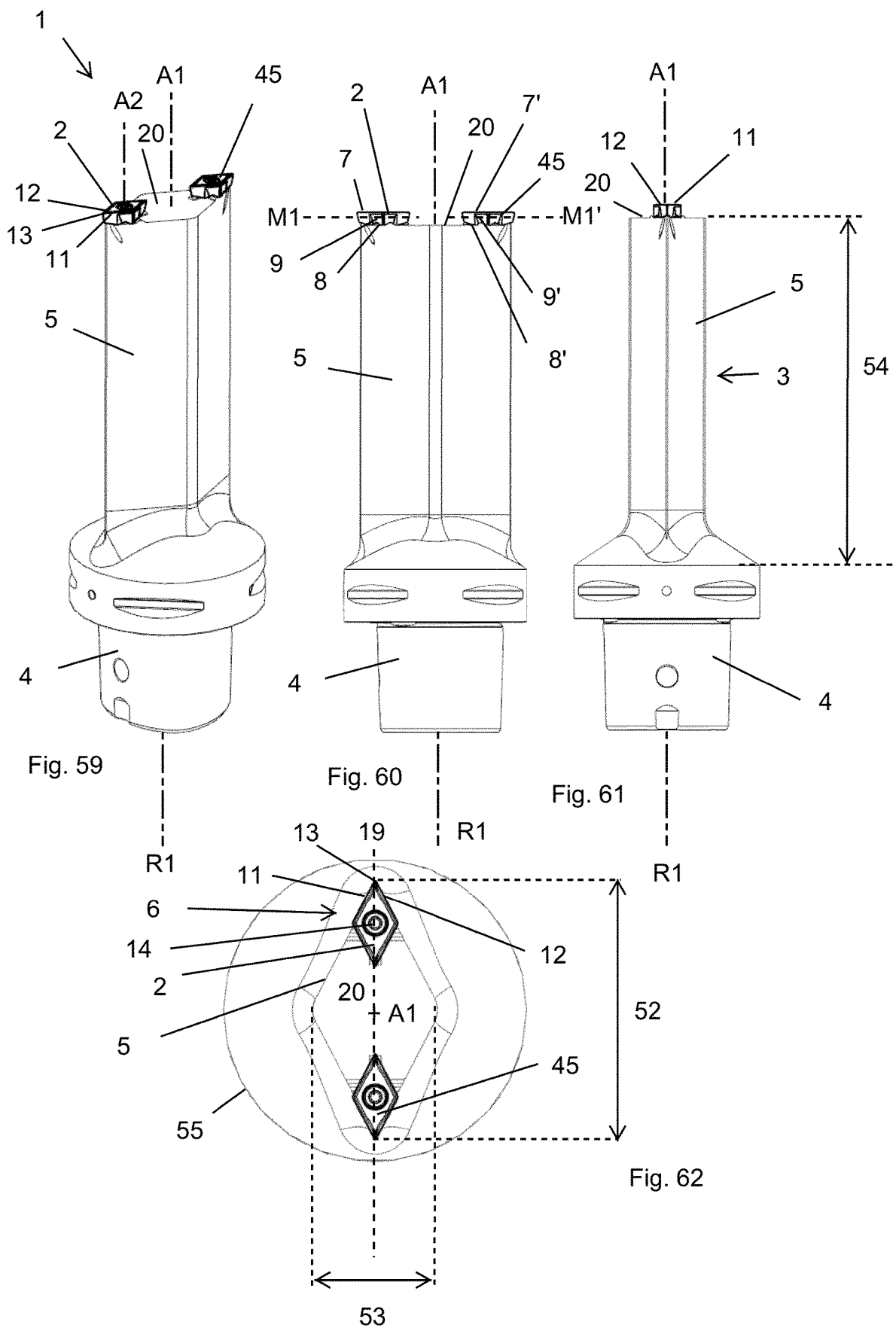

TURNING METHOD FOR A CNC-LATHE AND A TURNING TOOL

RELATED APPLICATION DATA

This application is a § 371 National Stage Application of PCT International Application No. PCT/EP2019/052097 filed Jan. 29, 2019 claiming priority to EP 18160706.0 filed Mar. 8, 2018, EP 18160713.6 filed Mar. 8, 2018, and EP 18202649.2 filed Oct. 25, 2018.

TECHNICAL FIELD OF THE INVENTION

The present invention belongs to the technical field of metal cutting. More specifically the present invention belongs to the field of turning of a metal work piece, by use of computer or computerized numerical control, i.e. CNC, machines. More specifically, the present invention relates to turning method, an automated computer-implemented method, and a turning tool.

BACKGROUND OF THE INVENTION AND PRIOR ART

In turning of metal work pieces using a CNC-lathe, many methods of turning are known. Conventionally, the orientation of the turning tool in relation to the work piece is constant during machining and a turning operation is performed in two linear axes. The entering angle, also known as setting angle, can conventionally not be chosen by other means than by changing the turning tool.

U.S. Pat. No. 6,715,386 B2 describe a method where various setting angles of a cutting insert can be carried out. As shown in FIG. 10, turning (i.e. rotation) of the cutting insert is made between a first machining sequence and a second machining sequence.

The inventors have found that a method for turning can be further improved. Especially, the inventors have found that there is a need to improve tool life and/or chip control.

SUMMARY OF THE INVENTION

The inventor has found that there is a need for an improved method for improving tool life and/or chip control. Especially, the inventors have found that there is a need for an improved method when machining a predefined feature having a complicated shape, especially an external groove. In such a case, the inventors have found that it is advantageous to vary the entering angle for reducing the risk of interference between inactive parts of the turning tool and the metal work piece, and/or improving chip control and/or tool life. The inventors have further found that there is a need for a turning method which reduces the risk of vibrations. The inventors have further found there is a need for a turning method which maximizes the cutting time of a CNC-lathe, thereby reducing the manufacturing cost. By such a turning method, the tool life can be increased because the risk of rapid changes in cutting force, e.g. from rapid changes in cutting depth, may be reduced. By such a turning method, a component or a feature of a component having a complicated shape, such as a groove, can be machined using a single turning tool, thereby reducing the machining time.

This aim is at least to some extent achieved by a turning method for a computerized numerical control lathe comprising the steps of: providing a turning tool comprising a cutting portion, the cutting portion comprising a first nose portion, the first nose portion comprising a first cutting edge, a second cutting edge, and a convex nose cutting edge connecting the first and second cutting edges, wherein the first and second cutting edges are straight or substantially straight in a top view; providing a metal work piece; rotating the metal work piece around a work piece rotational axis; making a first pass such that the first cutting edge is active and such that the second cutting edge is inactive, such that a first machined surface is generated by the convex nose cutting edge, and such that during at least a portion of the first pass, an entering angle and an angle which the first cutting edge forms in relation to the work piece rotational axis simultaneously varies.

Said method is thus a turning method, preferably an external turning method, where a rotationally symmetrical surface is formed. Said method is for a computerized numerical control (CNC) lathe. A turning tool is provided. The turning tool comprises a cutting portion, preferably in the form of a cutting insert in the form of a turning insert. The cutting portion comprises a first nose portion. Preferably, the cutting portion comprises a second nose portion. The first nose portion comprises a first cutting edge, a second cutting edge, and a convex nose cutting edge connecting the first and second cutting edges, wherein the first, second and nose cutting edges connects a top surface and a side surface. Said top surface is arranged to function as a rake face. Said top surface preferably comprises chip breaking means, preferably in the form of one or more protrusions and/or depressions. The first and second cutting edges are straight or substantially straight or linear in a top view. A metal work piece is provided which preferably is rotational symmetric or substantially rotational symmetric. The metal work piece is clamped to the CNC-lathe by clamping means, such as clamping jaws. The metal work piece may be clamped at one end or at opposite ends.

The metal work piece is rotated around a work piece rotational axis thereof. Preferably, the metal work piece is rotated in exactly one direction around the work piece rotational axis.

The first cutting edge is preferably active, i.e. in cut, during the entire time of cut during the first pass.

A pass can be understood as a turning sequence, which chronically can be defined as the time between going into cut and going out of cut, i.e. a time span during which chips are removed from the metal work piece. Said pass can further geometrically or spatially be defined as how the turning, more specifically the cutting portion of the turning tool, moves in relation to the metal work piece, from going into cut until going out of cut.

The expression "the first cutting edge is active and such that the second cutting edge is inactive" may alternatively be formulated as "the first cutting edge is ahead of the second cutting edge during the first pass".

During the first pass, or at least during a portion of the first pass, the first cutting edge is active, i.e. cutting metal, and the second cutting edge is inactive, i.e. not cutting metal. A first machined surface is generated by the convex nose cutting edge. During at least a portion of the first pass, an entering angle and an angle which the first cutting edge forms in relation to the work piece rotational axis simultaneously, i.e. synchronically, varies or changes.

In other words, the entering angle varies or changes, and the angle which the first cutting edge forms in relation to the work piece rotational axis varies or changes.

The entering angle is defined as the angle between the first cutting edge and the direction of movement of the surface generating point of the nose cutting edge.

The entering angle is preferably 5-140°, even more preferably 20-110°.

The entering angle may be constant at one or more portions during the first pass.

The angle which the first cutting edge forms in relation to the work piece rotational axis is preferably varies simultaneously as the entering angle varies during the first pass. In other words, said angles preferably varies synchronically during the first pass.

The variation or altering of said angles may be achieved by a rotation or movement of the work piece rotational axis. Alternatively, and preferably, the variation of said angles are achieved by a rotation or movement of the turning tool around a tool rotational axis. Said tool rotational axis preferably is normal or substantially normal to a plane comprising a top surface or rake face of the cutting portion. Said top surface or rake face is preferably not planar, however a plane may be defined which substantially comprises the top surface or rake face.

The first pass is defined as from going into cut until going out of cut, preferably from where the nose cutting edge goes into cut to where the nose cutting edge goes out of cut. The location on the metal work piece for going into cut is spaced apart from the location for going out of cut.

The cutting depth during the first pass may be constant. Alternatively, the cutting depth may vary during the first pass.

During the first pass, a cutting speed is preferably constant or substantially constant. Said cutting speed is preferably 40-1500 m/min, even more preferably 50-300 m/min.

The first pass preferably starts with an increasing cutting depth, and preferably ends with a decreasing cutting depth. Preferably, a cutting depth at an intermediate portion of the first pass is preferably constant, preferably 0.2-15 mm, even more preferably 0.4-4 mm. Said intermediate portion is preferably 50-99% of the first pass chronologically.

According to an embodiment, the first pass is a non-linear first pass.

By such a method, a feature having a complex shape can be machined in a shorter time.

The method comprises the step of making a non-linear first pass or tool path. Non-linear means that the machined surface generated from the first pass is not completely cylindrical, conical or flat.

That the first pass is non-linear means that the generated surface is non-cylindrical and/or non-conical and/or non-planar. The generated surface may e.g. comprise a combination or set of sub-surfaces such as a cylindrical surface and/or a planar surface and/or a concave surface and/or a convex surface. Preferably, the generated surface comprises a cylindrical surface, concentric with the rotational axis of the metal work piece, and a concave surface. In other words, the non-linear first pass preferably comprises a linear portion, e.g. a portion where a cylindrical surface is generated, and a curved portion, e.g. a portion where a concave surface is generated.

The first cutting edge is preferably active, i.e. in cut, during the entire time of cut during the non-linear first pass.

According to an embodiment, the method comprises the further step of during at least a portion of the first pass increasing the entering angle and reducing a surface generating feed rate.

By such a turning method, the risk of interference or crash is reduced. In other words, the risk of contact between a non-cutting portion of the turning tool and the metal work piece is reduced. By such a turning method, a more complicated shape may be machined.

By such a turning method, the chip control is further improved because a relatively low entering angle at a relatively early stage of the cut give a chip direction which is relatively more directed away from the rotational axis of the metal work piece, which may be an advantage when machining a complex shape such as an external groove.

By such a turning method, the tool life can be improved. This is because that the maximum chip thickness varies less than if the surface generating feed would be constant. A further aspect is that the inventors have found that a relatively low entering angle is advantageous for tool life, and high entering angle is advantageous at least generally with respect of reducing the collision risk, and the collision risk generally increases as the pass progresses. Thus, by such a turning method, the risk of interference or crash is reduced. In other words, the risk of contact between a non-cutting portion of the turning tool and the metal work piece is reduced. By such a turning method, a more complicated shape may be machined.

The surface generating feed rate is a velocity. The surface generating feed rate may preferably be 0.05-1.2 mm per revolution. The surface generating point of the nose cutting edge preferably moves along the nose cutting edge. However, this effect is normally small.

When the entering angle varies, the distance which a surface generating point of the nose cutting edge moves per revolution can be designated as the surface generating feed rate and can be found as the distance which the surface generating point of the nose cutting edge moves per revolution of the metal work piece.

The machined surface has a shape and/or structure which is wave-shaped. The distance between adjacent tops or cusps is equal to the surface generating feed rate.

The result of such a method can e.g. be seen on a machined component, where a distance between feed marks, such as cusps, is smaller at the end of the pass or is decreasing towards the end of the pass.

During at least a portion of the first pass, the entering angle preferably increases simultaneously, i.e. synchronically, as the velocity of the nose cutting edge, or more precisely a surface generating point of the nose cutting edge, is decreased. In other words, preferably the entering angle increases simultaneously as the surface generating feed rate decreases.

Alternatively, the entering angle may increase incrementally, such as increasing in steps of a fixed value, such as in steps of 1° or 2° simultaneously as the feed rate decrease incrementally, such as decreasing in steps of a fixed value or multiples of a fixed value, such as in steps of e.g. 0.001 or 0.005 mm per revolution.

According to an embodiment, the entering angle and the angle which the first cutting edge forms in relation to the work piece rotational axis continuously varies.

By such a smooth or step-less or seam-less variation of said angles, the inventors have found that the machined surface quality is improved.

The entering angle continuously, i.e. uninterruptedly or gradually, varies or changes.

The angle which the first cutting edge forms in relation to the work piece rotational axis continuously, i.e. uninterruptedly or gradually, varies or changes.

According to an embodiment, the entering angle and the angle which the first cutting edge forms in relation to the work piece rotational axis varies by a rotation of the turning tool around a tool rotational axis, wherein the tool rotational axis is perpendicular to or substantially perpendicular to the work piece rotational axis.

By such a turning method, where the tool rotational axis is perpendicular to the work piece rotational axis, the variation of said angles may be achieved by a variation of the same amount of the machine spindle, to which machine spindle said turning tool is connected.

The expression "substantially perpendicular" means that the tool rotational axis is within 15° from being perpendicular to the work piece rotational axis.

Preferably, the turning tool is elongated along the tool rotational axis. In other words, the turning tool is more elongated along the tool rotational axis that along axes perpendicular to the tool rotational axis.

Preferably, a top surface of the cutting portion, the top surface being connected to the first, second and nose cutting edges, is arranged in a plane perpendicular to or substantially perpendicular to the tool rotational axis. Said top surface is facing away from the coupling portion of the turning tool.

By such a method, the risk for vibrations is reduced.

Preferably, the rotation of the turning tool around a tool rotational axis during the first pass is in one direction only, i.e. clock-wise only or anti clock-wise only.

If the turning method comprises a second pass, such as a non-linear second pass, the rotation of the turning tool around a tool rotational axis is preferably in the opposite direction in relation to the direction of rotation during the first pass.

Regarding the metal work piece, the direction of rotation around said work piece rotational axis is the same during both the first and second passes.

Preferably, the rotation of the turning tool around a tool rotational axis during the first pass is 50-200°, even more preferably 70-160°.

According to an embodiment, the method comprises the further step of during at least a portion of the first pass moving the tool rotational axis in relation to the work piece rotational axis.

By such a turning method, the turning method can be performed in an easier manner, compared to if the tool rotational axis and/or metal workpiece was moving.

In other words, the movement of the turning tool in relation to the metal work piece includes a movement of the tool rotational axis in relation to the work piece rotational axis. Said movement of the tool rotational axis is preferably a parallel movement. Said movement preferably includes a non-linear movement. The work piece rotational axis is not moving.

According to an embodiment, the method comprises the further step of during at least a portion of the first pass moving the turning tool towards the work piece rotational axis.

By such a turning method, the first machined surface is an external surface, which may comprise an internal corner and/or a groove and/or a pocket and/or a concavity.

Said internal corner is less than 180°, preferably 90°+/− 10°. A 90° internal corner comprises a cylindrical or conical first surface and a flat or conical second surface, where the second surface is a radially outer surface and where the first surface and the second surface are connected. Radially outer means radially outer in relation to the work piece rotational axis, i.e. at a greater distance from the work piece rotational axis. Said first and second surface are preferably connected by a concave surface. Preferably, said internal corner comprises a cylindrical first surface and a flat second surface, where said first and second surfaces are connected by a concave surface, and where said second surface is a radially outer surface.

According to an embodiment, the entering angle and the angle which the first cutting edge forms in relation to the work piece rotational axis varies during a non-linear portion of the non-linear first pass.

In other words, both of said angles varies during at least a portion of a non-linear portion, such as a curved segment, of the non-linear first pass.

According to an embodiment, the method comprises the further step of setting a maximum chip thickness to a constant predetermined value or to be within a predetermined range during at least a portion of the first pass.

By such a turning method, the tool life and/or chip control is further improved.

The result of such a method can e.g. be seen on a machined component, where a distance between feed marks, such as cusps, is smaller at the end of the pass or is decreasing towards the end of the pass.

The maximum chip thickness $h_x$, also known as undeformed chip thickness, sometimes called "hex", is the maximum chip thickness measured in a direction perpendicular to the chip generating first cutting edge, if the second cutting edge is inactive. If the second cutting edge is active and the first cutting edge is inactive, the maximum chip thickness is measured perpendicular to the chip generating second cutting edge. In turning, where the entering angle and the feed rate are constant and where the cutting depth is above the nose cutting edge, the chip thickness $h_x$ is constant and defined as f×sin K, where f is the feed rate per revolution and K is the entering angle. For example, at a 90° entering angle, the chip thickness, or maximum chip thickness, is equal to the feed rate. In this present case though, the entering angle may vary, and the feed rate may vary along the first cutting edge.

When the entering angle K varies, the maximum chip thickness $h_x$ is the maximum chip thickness measured along a line perpendicular to the first cutting edge.

When the entering angle K varies, the distance which the surface generating point of the nose cutting edge moves per revolution can be designated as the feed rate per revolution. Said feed rate per revolution in this case, when the entering angle K varies, can be designated as the surface generating feed rate, and can be fined as the distance which the surface generating point of the nose cutting edge moves per revolution of the metal work piece.

"Substantially constant maximum chip thickness" means that the maximum chip thickness $h_x$ varies within +/−25% during at least 90% of the first and/or second pass. The entering angle K is defined as the angle between the surface generating feed direction and the active main cutting edge, i.e. the first cutting edge, or the second cutting edge. During the first pass, the first cutting edge is the active main cutting edge. During the second pass, the second cutting edge is the main cutting edge. Said entering angle K is preferably less than or equal to 130°, preferably 5°-110°.

Said predetermined value or predetermined range may preferably be automatically selected from an electronic database or an electronic library. Preferably, said predetermined value or predetermined range is equal to or substantially equal a feed recommendation from the manufacturer of the cutting portion, preferably with the material of the metal work piece taken into account.

Preferably, the maximum chip thickness $h_x$ is 0.01-3 mm, more preferably 0.03-2 mm, even more preferably 0.04-1.2 mm.

According to an embodiment, the first non-linear pass includes machining of a bottom surface of an external groove, wherein the groove is limited by a first side wall, a second side wall, the bottom surface, a first corner surface and a second corner surface, wherein the first corner surface is connecting the bottom surface and the first side wall, wherein the second corner surface is connecting the bottom surface and the second side wall, wherein the method comprises the steps of moving the nose cutting edge towards the first corner surface; and increasing a speed of rotation of the turning tool around the tool rotational axis as a portion of the turning tool, spaced apart from the first cutting insert, reaches a predetermined distance from the first side wall.

The first non-linear pass thus includes machining of a bottom surface, and preferably a first corner surface of an external groove. The bottom surface is preferably a cylindrical surface concentric with the work piece rotational axis.

In other words, the first machined surface includes the bottom surface of the groove.

The groove, or pocket, is an external groove. The groove preferably opens in a direction away from the work piece rotational axis. Alternatively, the groove opens in a direction which is parallel to or substantially parallel to the work piece rotational axis.

The groove is limited by a first side wall, i.e. a first side wall surface, and a second side wall, i.e. a second side wall surface, which each preferably are perpendicular to or substantially to the work piece rotational axis. The first side wall is facing the second side wall.

The groove is further limited by a first corner surface and a second corner surface, where said corner surfaces are concave surfaces.

The method comprises the steps of generating a portion of the first machined surface, i.e. at least a portion of the bottom surface, by moving the surface generating nose cutting edge towards the first corner surface; and increasing a speed of rotation of the turning tool around the tool rotational axis as a portion of the turning tool, wherein said portion is inside the groove and spaced apart from the first cutting insert, reaches a predetermined distance, measured parallel to the work piece rotational axis, from the first side wall.

Increasing the speed of rotation of the turning tool around the tool rotational axis can alternatively be understood as increasing the speed of entering angle increase. In other words, the increase rate of the entering angle is not constant as said portion of the turning tool reaches said predetermined distance from the first side wall.

In other words, said portion of the turning tool reached said predetermined distance from the first side wall prior to the surface generating nose cutting edge.

The predetermined distance is preferably 1-30 mm, even more preferably 2-15 mm.

Said portion of the turning tool is preferably either a front end of the tool body, or a second cutting insert connected to said front end of the tool body.

According to an embodiment, the method comprises the further step of during at least a portion of the first pass setting a chip area to be below a predetermined value or to be within a predetermined range.

By such a turning method, the tool life may be improved.

The normal definition of chip area is depth of cut (also known as cutting depth)×feed per revolution. The revolution is related to the work piece. In other words, the chip area is the area of material removed per revolution. More specifically, the feed per revolution is defined as the distance which the surface generating point of the nose cutting edge travels per revolution.

According to an embodiment, the method comprises the further step of setting the maximum chip width to a predetermined value or to a predetermined range during at least a portion of the first pass.

By such a turning method, the tool life may be improved.

The term setting the maximum chip width means to select a predetermined point or range along the first cutting edge which is active during the first pass. In other words, a portion of the first cutting edge is inactive. The maximum chip width is preferably less than or equal to 12 mm, even more preferably less than or equal to 6 mm, even more preferably less than or equal to 3 mm. The maximum chip width is preferably more than or equal to 0.2 mm, more preferably more than or equal to 0.5 mm.

Preferably, the maximum width varies within +/−40%, even more preferably within +/−20%, from a predetermined value.

Alternatively, formulated, the method comprises the step of setting the cutting depth to be a predetermined value or to be within a predetermined range.

According to an embodiment, the method comprises the further step of making a second pass such that the second cutting edge is active and such that the first cutting edge is inactive, wherein at least a portion of the first machined surface is machined during the second pass, thereby generating a second machined surface by the convex nose cutting edge.

By such a turning method, the machining time can be reduced especially when e.g. a pocket or a groove is to be machined and where a large depth of material needs to be removed.

Preferably, the direction of rotation of the metal work piece around said work piece rotational axis is the same during both the first and second passes.

Preferably, a direction of the second pass is opposite to or substantially opposite to the first pass.

According to an embodiment, the cutting portion is in the form of a cutting insert, wherein the cutting insert comprises a top surface, wherein in a top view an angle between the first cutting edge and a second cutting edge is less than 90°, and wherein in a top view, the convex nose cutting edge has a radius of curvature which is 0.15-1.3 mm, wherein the turning tool comprises a tool body, wherein the tool body comprises a coupling portion, an intermediate portion, and an insert seat, wherein the intermediate portion extending along a longitudinal center axis thereof, wherein the cutting insert is mounted in the insert seat, wherein the tool body extends between the coupling portion and a front end of the tool body, wherein the front end of the tool body comprises the insert seat, wherein the top surface of the cutting insert is facing away from the coupling portion, wherein a longitudinal center axis of the coupling portion defines a tool rotational axis, wherein the entering angle and the angle which the first cutting edge forms in relation to the work piece rotational axis varies during the first pass as a result of a rotation of the turning tool around the tool rotational axis.

By such a method, the risk for vibrations is further reduced, because cutting forces are directed towards the coupling forces to a greater extent. The angle between the first cutting edge and a second cutting edge is preferably 10-80°, even more preferably 10-65°. By such a turning tool, more complex shapes can be machined, compared to if said angle would be greater than 80°.

In a top view, the cutting insert is preferably completely inside an outer peripheral surface of the coupling portion.

According to an embodiment, in a top view, the intermediate portion is at least 50% more elongated along a bisector formed between the first and second cutting edges than along a line which is perpendicular to the bisector and intersecting the longitudinal center axis of the intermediate portion.

Formulated differently, the front end of the tool body is at least 50% more elongated along a bisector formed between the first and second cutting edges than along a line which is perpendicular to the bisector and intersecting the longitudinal center axis of the intermediate portion.

According to an embodiment, a computer program has instructions which when executed by a computer numerical control lathe cause the computer numerical control lathe to perform the above described method.

Said computer program, or computer program product, thus controls the tool path of the turning tool, the cutting data and the rotation of the metal work piece.

By such a computer program, said turning method can be easily implemented on numerous CNC-lathes or CNC-machines.

Said computer program have instructions for controlling movement and rotation of the turning tool, and instructions for rotation of the metal work piece, for removing stock by means of a turning operation according to the above defined method.

Said instructions may include cutting data such as cutting speed, feed rate, tool path and cutting depth.

A computer readable medium may have stored thereon said computer program.

A data stream may be representative of said computer program.

According to an aspect of the invention, an automated computer-implemented method for generating commands for controlling a computer numerically controlled machine to fabricate a feature from a metal workpiece rotatable around a work piece rotational axis thereof by means of any of the above described turning tools,
wherein the method comprises the step of configuring a first pass according to any of the above described first passes.

According to an aspect of the invention, an automated computer-implemented method for generating commands for controlling a computer numerically controlled machine to fabricate a feature from a metal workpiece rotatable around a work piece rotational axis thereof by means of a turning tool,
wherein the turning tool comprises a cutting portion, the cutting portion comprises a first nose portion, the first nose portion comprises a first cutting edge, a second cutting edge, and a convex nose cutting edge connecting the first and second cutting edges, wherein the first and second cutting edges are straight or substantially straight in a top view,
wherein the method comprises the step of:
configuring a first pass such that the first cutting edge is active and such that the second cutting edge is inactive, such that a first machined surface is generated by the convex nose cutting edge, and such that during at least a portion of the first pass, an entering angle and an angle which the first cutting edge forms in relation to the work piece rotational axis simultaneously varies.

Preferably, a tool path designer, using the automated computer implemented method for generating commands for controlling a computer numerical controlled machine, accesses a CAD drawing of the feature in a standard CAD format. The tool path designer selects the turning tool to be used in fabrication of the feature from a menu. The tool path designer defines the properties of the turning tool, e.g. by collecting the characteristics of the turning tool from an electronic tool library or by other means. Said tool characteristics include the geometry or outer boundary lines of the turning tool and cutting data recommendations. For the sake of simplicity, the illustrated feature is chosen to be a feature, e.g. an external groove, that can be fabricated by a single machining function. It is appreciated that the applicability of the present invention is not limited to features which can be fabricated by a single machining function.

The tool path designer then defines the geometry of the metal work piece to be used in fabrication of the feature. This may be done automatically by the automated computer implemented apparatus of the present invention or manually by the tool path designer. The tool path designer then specifies the specific metal material of the metal work piece. A set of machining steps or passes may be calculated recursively, whereby preferably initially a first pass is calculated for an initial region of the workpiece, and thereafter a subsequent second pass is similarly calculated for a remaining region of the workpiece. Said first and second passes are preferably non-linear. Additional subsequent sequential machining steps or passes may be similarly calculated, until a tool path for machining the desired feature has been calculated.

The automated computer-implemented method may preferably be used in computer aided manufacturing. The method preferably takes into account constraints such as the shape of the feature and the shape of the turning tool. The method preferably includes the constraint of minimizing the risk of collision between the metal work piece and the turning tool. The automated computer-implemented method can preferably be used for any of the above described turning method embodiments or parts thereof.

The automated computer-implemented method preferably comprises the further step of during at least a portion of the first pass increasing the entering angle and reducing a surface generating feed rate, preferably simultaneously.

According to an embodiment, the automated computer-implemented method comprises the further step of setting a maximum chip thickness to a constant predetermined value or to be within a predetermined range during at least a portion of the first pass.

Preferably, said value or range of the maximum chip thickness is chosen from an electronic tool library or an electronic machining database, which preferably includes the material and shape of the cutting portion (preferably in the form of a cutting insert) and recommended cutting data for such cutting portion for at least one specific type of metal. The maximum chip thickness is in other words selected as a result of at least the metal work piece material and/or the material and/or shape of the cutting portion.

The tool path designer preferably sets a first entering angle, related to a first point of the first pass, and a second entering angle, related to a second point of the first pass, whereby the automated computer-implemented method preferably comprises the further steps of: calculating the surface generating feed rate of feed rate, according to the formula f=maximum chip thickness/sin K, for the first and second points; and linearly interpolating the feed rate (or surface generating feed rate) and entering angle for each point along the machined surface between said first point and said second point.

According to an embodiment, the feature is in the form of an external groove limited by a bottom surface, first and second side walls, and first and second corner surfaces,
wherein the first corner surface connects the bottom surface and the first side wall,
wherein the second corner surface connects the bottom surface and the second side wall,
wherein the first pass includes the machining of the bottom surface and the second corner surface,
wherein the method comprises the further steps of setting a corner entering angle, a corner exit entering angle, and a longitudinal exit entering angle,
and step-less or incrementally vary the entering angle between the corner entering angle and the corner exit entering angle, and between the corner entering angle and the longitudinal exit entering angle.

The bottom surface is preferably a cylindrical surface concentric with the rotational axis of the metal work piece. The first and second side walls are preferably flat or substantially flat and perpendicular to the rotational axis of the metal work piece. The first and second corner surfaces are preferably curved, preferably having a constant radius of curvature.

The first pass is non-linear and includes the machining of the bottom surface and the second corner surface, preferably also the first corner surface.

The non-linear first pass comprises the machining of the second corner surface in a curved direction towards the rotational axis and towards the bottom surface, followed by the machining of the bottom surface in a direction away from the second corner surface.

The corner entering angle is the entering angle at the start or entry of the machining of the second corner surface. The corner exit entering angle is the entering angle at the end or exit of the second corner surface. The corner exit entering angle is equal to a longitudinal entering angle. The longitudinal exit entering angle is the entering angle at the start or entry of the machining of the bottom surface.

Preferably, the corner entering angle is greater than the corner exit entering angle.

Preferably, the longitudinal exit entering angle is greater than the corner exit entering angle.

Preferably, the corner entering angle is set to 60-120°, even more preferably 80-110°.

Preferably, the corner exit entering angle is set to 20-80°, even more preferably 25-45°.

Preferably, the longitudinal exit entering angle is set to 60-120°, even more preferably 80-110°.

Preferably, the non-linear first pass includes the machining of the first corner surface, which is made immediately after the machining of the bottom surface.

The entering angle at the start or entry of the machining of the first corner surface is equal to the longitudinal exit entering angle.

The entering angle at the end or exit of the first corner surface is designated $K_6$, and is preferably set to 10-80°, even more preferably 25-45°.

The non-linear first pass may be such that the nose cutting edge goes into cut prior to the second corner surface. In such a case, an entry entering angle is designated $K_1$.

All entering angles are defined as the angle between the first cutting edge and the surface generating feed direction.

The first cutting edge is active at least during the machining of the bottom surface. Even if the first cutting edge is inactive during a portion of the non-linear first pass, an entering angle may still be defined following the above definition.

The entering angle K is preferably varied continuously, i.e. without steps, during at least a portion of the non-linear first pass. Alternatively, the entering angle K is incrementally varied, preferably in steps of less than 2°. The CNC-lathe sets the limit for variation of the entering angle. Preferably, the automated computer-implemented method comprises a second non-linear pass, where the first corner surface is machined prior to the bottom surface, and where the bottom surface is machined prior to the second corner surface.

In other words, the non-linear second pass is generally in an opposite direction to the non-linear first pass.

During the second non-linear pass, entering angles are preferably selected in a corresponding manner as for the non-linear first pass. Preferably, the automated computer-implemented method comprises a sequence where the non-linear passes are alternated.

According to an aspect, a turning tool comprises a tool body and a cutting portion, wherein the cutting portion comprises a first cutting insert and a second cutting insert,
wherein the tool body comprises a coupling portion, an intermediate portion, a first insert seat for the first cutting insert and a second insert seat for the second cutting insert,
wherein the tool body extends between the coupling portion and a front end of the tool body,
wherein the front end of the tool body comprises the first insert seat and the second insert seat,
wherein the first cutting insert comprises a bottom surface opposite a top surface, wherein a side surface connects the top and bottom surfaces,
wherein a mid-plane extends mid-way between the top and bottom surfaces,
wherein the top surface of the first cutting insert is facing away from the coupling portion,
wherein the second cutting insert comprises a bottom surface opposite a top surface, wherein a side surface connects the top and bottom surfaces,
wherein a mid-plane extends mid-way between the top and bottom surfaces,
wherein the top surface of the second cutting insert is facing away from the coupling portion,
wherein a longitudinal center axis of the coupling portion defines a tool rotational axis,
wherein the intermediate portion extending along a longitudinal center axis thereof,
wherein in a top view, a greatest distance between the first and second cutting inserts is greater than a width of the front end of the tool body, where said width of the front end of the tool body is measured perpendicular to said greatest distance between the first and second cutting inserts,
wherein a length of the intermediate portion, measured along the longitudinal center axis, is greater than the greatest distance between the first and second cutting inserts.

By such a turning tool, the machine utilization may be further improved.

By such a turning tool, complex shapes can be machined more efficiently.

The turning tool is suitable for use in the above defined turning method.

The first and second cutting inserts are preferably made from a wear resistant material suitable for metal cutting, such as e.g. cemented carbide.

The coupling portion and the intermediate portion are preferably permanently connected, preferably from a piece of steel, and jointly form a tool body.

The tool body extends between the coupling portion, arranged to be connected directly or indirectly to a machine interface of a CNC-lathe, and a front end facing away from the coupling portion.

The front end of the tool body comprises the first insert seat for the first cutting insert and the second insert seat for the second cutting insert.

The first cutting insert comprises a bottom surface arranged to function as a seating surface and an opposite a top surface arranged to comprise a rake face. The top surface of the first cutting insert is facing away from the coupling portion.

The top surface preferably comprises chip breaking means, preferably in the form of one or more protrusions and/or depressions. The bottom surface preferably comprises anti-rotation means in the form of one or more protrusions and/or depressions, for co-operation with anti-rotation means in the first insert seat. Alternatively, the bottom surface may be without anti-rotation means. For example, the bottom surface may be flat or substantially flat. In such a case, the side surface, which connects the top and bottom surfaces, function as a seating surface or a contact surface, i.e. the side surface is in contact with a surface of the first insert seat.

One or more cutting edges are formed in the intersection between the top surface and the side surface. In a top view, the top surface may have any shape.

The first and second cutting insert may comprise respective first and second cutting edges, connected by a respective nose cutting edge. In a top view, the front end of the tool body is inside lines coinciding with the respective first and second cutting edges of the first and second cutting inserts. By such a turning tool, more complex shapes can be machined.

The first cutting insert comprise a cutting edge, arranged to be a surface generating cutting edge, which in top view is convexly curved, such as a preferably in the form of a circular arc or a circle having a radius of curvature of 0.15-30 mm, even more preferably 0.3-25 mm.

A mid-plane extends mid-way between the top and bottom surfaces and is preferably arranged perpendicular to or substantially perpendicular to the longitudinal center axis of the intermediate portion.

Preferably, a hole, i.e. a through hole, for a clamping screw preferably opens in the top and bottom surfaces.

The second cutting insert may be arranged, i.e. shaped, in a corresponding manner as the first cutting insert. Alternatively, the second cutting insert may have a shape which is different to the first cutting insert. The top surface of the second cutting insert is facing away from the coupling portion.

In a top view, the cutting first and second cutting inserts are preferably completely inside an outer peripheral surface of the coupling portion. The second cutting insert is positioned in the second insert seat.

The first and the second cutting inserts are detachably clamped or mounted in respective insert seats by clamping means, preferably in the form of a clamping screw.

The first and second insert seats are spaced apart and are preferably located on opposite sides relative to the longitudinal center axis of the intermediate portion. The first and second cutting inserts each form free ends of the turning tool. In other words, each of the first and second cutting insert comprises surface generating convex cutting edges which form free ends of the turning tool.

A mid-plane of the second cutting insert, which extends mid-way between the top and bottom surfaces of the second cutting insert is preferable co-planar with a corresponding mid-plane of the first cutting insert.

A longitudinal center axis of the coupling portion defines a tool rotational axis, and is preferably co-linear, alternatively parallel to the longitudinal center axis of the intermediate portion.

In a top view, a greatest distance between the first and second cutting inserts, more specifically portions of the first and second cutting inserts which are arranged to function as surface generating portions or cutting edges, is greater than a width of the front end of the tool body, where said width of the front end of the tool body is measured perpendicular to said greatest distance between the first and second cutting inserts.

In other words, the front end, and the intermediate portion, is elongated when seen in a front view.

The intermediate portion has a length or distance along the longitudinal center axis. Cross sections of the intermediate portion are preferably uniform or substantially uniform from the front end of the tool body up to at least 50%, even more preferably up to at least 70%, of said distance.

Said length or distance of the intermediate portion is greater, even more preferably 50-300% greater, than a greatest distance between the first and second cutting inserts.

DESCRIPTION OF THE DRAWINGS

The present invention will now be explained in more detail by a description of different embodiments of the invention and by reference to the accompanying drawings.

FIG. 1 is a perspective view of a tool body which is part of a first turning tool.

FIG. 2 is a perspective view of the first turning tool.

FIG. 3 is a perspective view of the insert seat of the tool body in FIG. 1.

FIG. 13 is a perspective view of the cutting insert in FIG. 9.

FIG. 14 is a side view of the cutting insert in FIG. 13.

FIG. 15 is a top view of the cutting insert in FIG. 13.

FIG. 16 is a further perspective view of the cutting insert in FIG. 13.

FIGS. 40-49 are illustrations of a fifth turning method.

FIGS. 53-58 are illustrations of a ninth turning method using the fifth turning tool.

FIG. 59 is a perspective view of a fifth turning tool.

FIG. 60 is a side view of the turning tool shown in FIG. 59.

FIG. 61 is a further side view of the turning tool shown in FIG. 59.

FIG. 62 is a top view of the turning tool shown in FIG. 59.

Figures 4, 5:
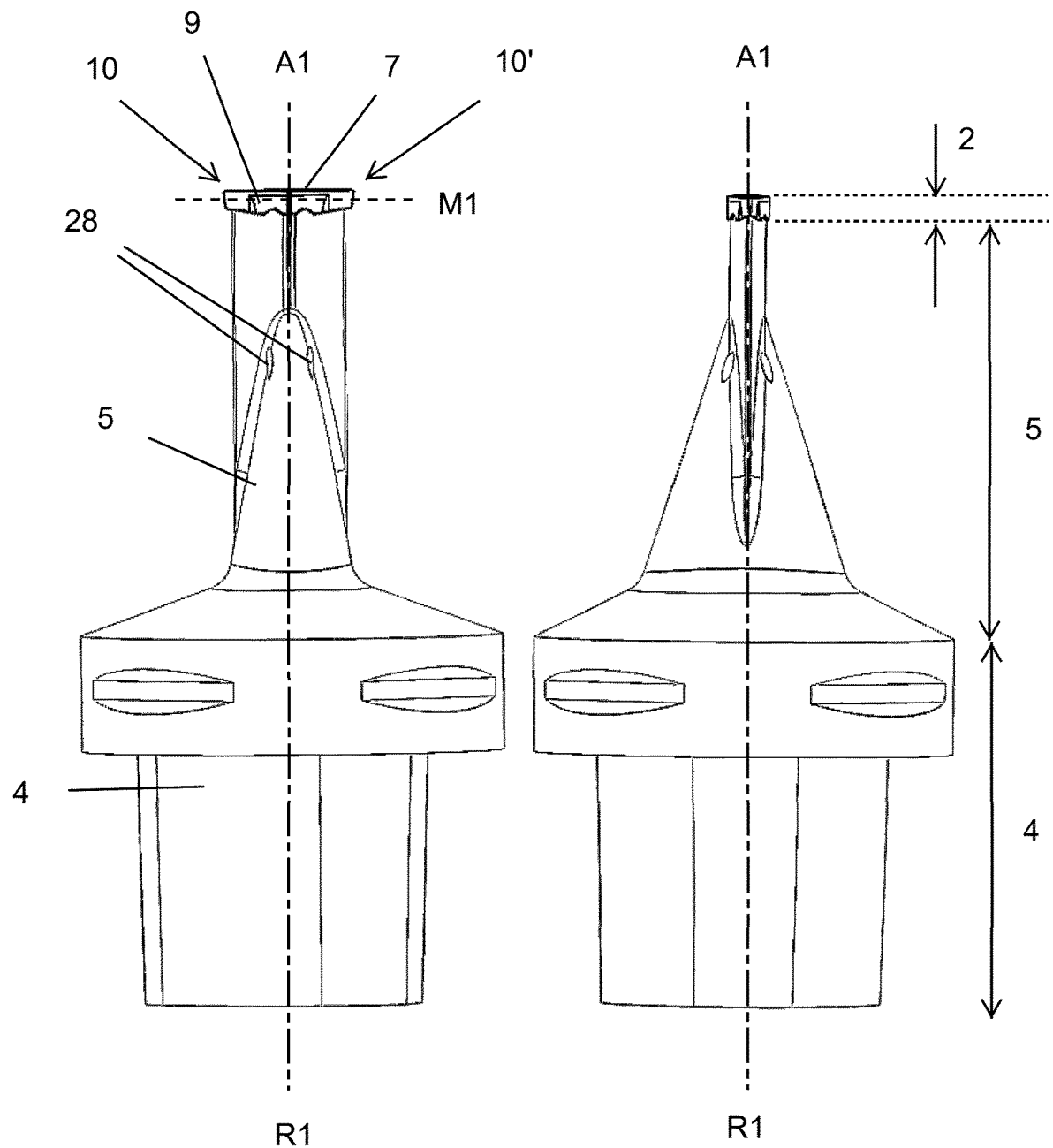
FIG. 4 is a side view of the turning tool in FIG. 2.
FIG. 5 is a further side view of the turning tool in FIG. 2.

All turning tool and cutting insert figures have been drawn to scale.

DETAILED DESCRIPTION OF EMBODIMENTS OF THE INVENTION

The invention will now be described more in detail, and examples of turning tools which can be used to perform the method according to the invention are described. Five turning tools are explained in more detail. Such turning tools have been found to be particularly suitable for performing the above described turning method. Nine turning methods will be describe, some in general terms, some in more detail. All described turning tools can be used for any of the described turning methods.

Reference is made to FIGS. 1-5 which shows a first turning tool 1 comprising a tool body 3 and a first cutting insert 2. The tool body 3 is shown in FIG. 1 without the cutting insert 2. The turning tool comprises an insert seat 6 which is shown in FIG. 3. The turning tool 1 is a turning tool, comprising a coupling portion 4, an intermediate portion 5 and a cutting portion 2. The coupling portion 4 and the intermediate portion 5 are permanently connected and jointly form a tool body 3 made from steel. The first cutting insert 2 is made from cemented carbide. The first turning tool 1 comprises only one cutting insert. The coupling portion 4 is suitable to be connected to a rotatable machine interface (not shown), such as a machine spindle. The coupling portion 4 comprise a substantially conical or tapered portion 39 and a ring-shaped portion 40 in accordance to ISO 26623-1:2014. Alternatively, other quick shape coupling portions may be used.

A front end 20 or a forward end of the tool body 3 is defined by a first insert seat 6 for the first cutting insert 2. The first cutting insert 2 is detachably clamped in the first insert seat 6 by clamping means 14, said clamping means being in the form of a clamping screw 14.

The first cutting insert 2 comprises a bottom surface 8 opposite a top surface 7. A side surface 9 connects the top and bottom surfaces 7, 8. As seen in FIG. 4, a mid-plane M1 extends mid-way between the top and bottom surfaces 7, 8.

The intermediate portion 5 extends between the coupling portion 4 and the cutting portion 2.

A longitudinal center axis of the coupling portion 4 defines a tool rotational axis R1.

The intermediate portion 5 extends along a longitudinal center axis A1 thereof.

For the first turning tool 1, the longitudinal center axis A1 is co-linear or co-axial with the tool rotational axis R1, as seen in FIGS. 2, 4 and 5.

The mid-plane M1 is perpendicular to the longitudinal center axis A1 of the intermediate portion 5, and perpendicular to the rotational axis R1.

The top surface 7 of the first cutting insert 2 is facing away from the coupling portion 4. The top surface 7 is non-planar, and comprises chip breaking means or chip breakers, in the form of protrusions.

The first cutting insert 2 comprises a first and a second nose portion 10, 10', which each form free ends of the turning tool 1.

Figure 8:
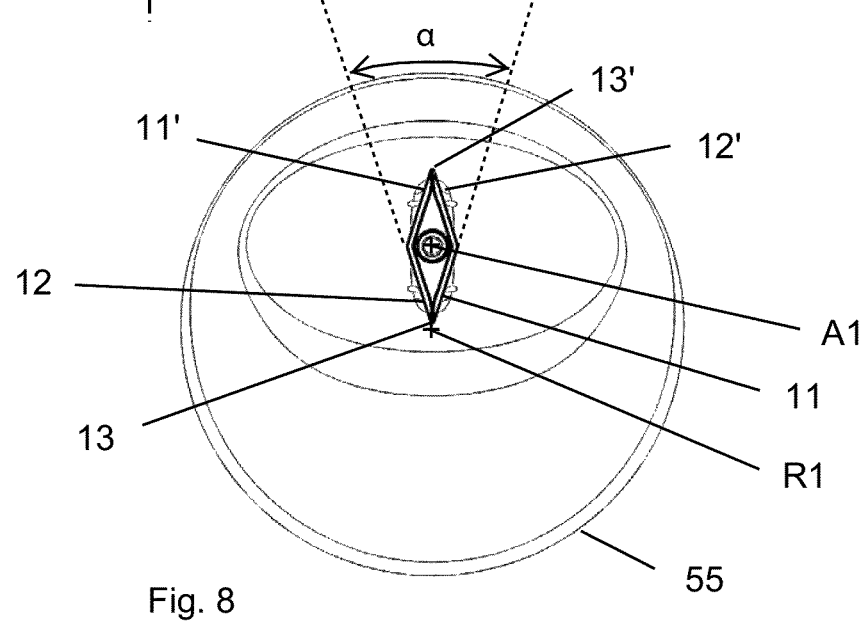
FIG. 8 is a top view of the turning tool in FIG. 6.
Figure 9:
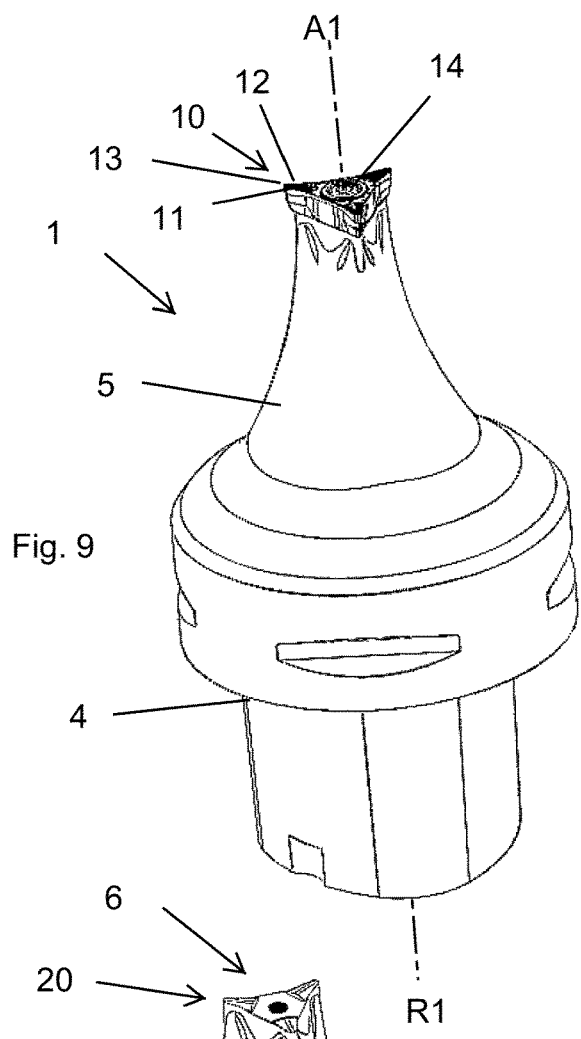
FIG. 9 is a perspective view of a third turning tool.
Figure 10:
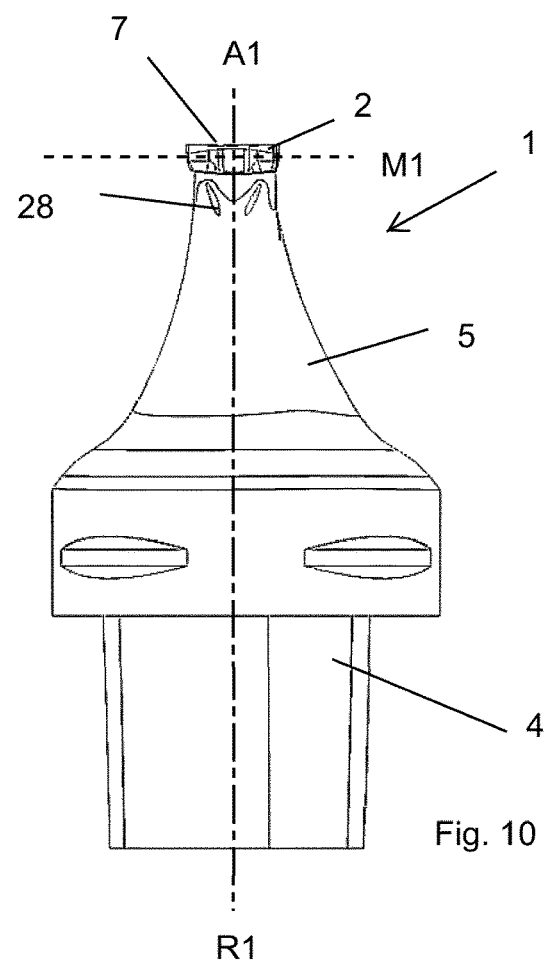
FIG. 10 is a side view of the turning tool in FIG. 9.
Figure 11:
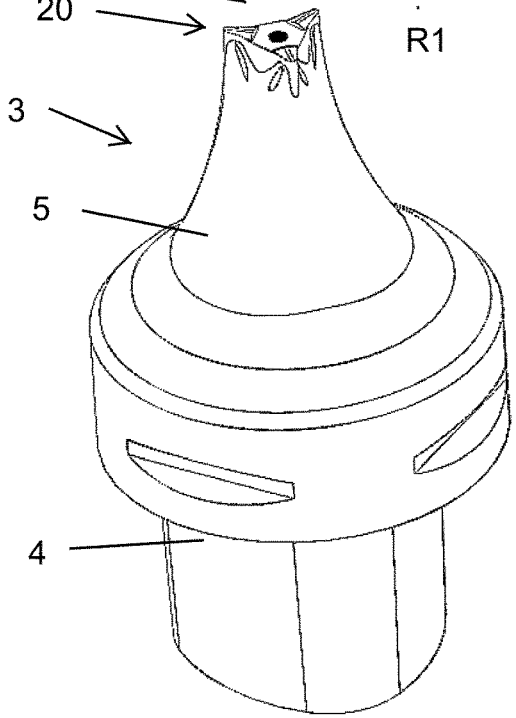
FIG. 11 is a perspective view of the tool body in FIG. 9.

The first nose portion 10 comprises a first cutting edge 11, a second cutting edge 12, both straight in a top view, and a convex nose cutting edge 13 connecting the first and second cutting edges 11, 12. The convex nose cutting edge 13 is convex in a top view. The nose cutting edge 13 is in top view convexly curved having a radius of curvature of 0.15-1.3 mm. Although a top view of the turning tool according to the first embodiment is not shown, a top view of the first cutting insert 2 according to the first embodiment is shown in FIG. 8 which show an identical cutting insert. According to the first embodiment, the radius of curvature is 0.4 mm. The first and second cutting edges 11, 12 forms a nose angle which is 35°.

In a top view, the first and second nose portions 10, 10' form an angle of 180° relative to each other measured around the longitudinal center axis A1 of the intermediate portion 5.

The first cutting insert 2 is 180° symmetric in top and bottom views. The first cutting insert is in a top view parallelogram-shaped.

As seen in FIG. 3, the first insert seat 6 comprises first insert seat rotational locking means comprising ridges 23-26, where two ridges 23, 26 are co-linear, and two ridges 24, 25 are parallel.

The first cutting insert 2 comprises first cutting insert rotational locking means in the form of grooves (not shown), formed in the bottom surface 8, co-operating with the first insert seat rotational locking means 23-26. The first cutting insert 2 comprises a hole for the clamping screw 14. Said hole 13 intersects the top and bottom surfaces 8, 9, and a center axis thereof defines a first cutting insert center axis co-linear with the rotational axis R1 and the longitudinal center axis A1.

The turning tool 1 comprises a coolant channel formed in the tool body 3 and extending between the coupling portion 4 and a nozzle 28. Said nozzle 28 is formed in the intermediate portion 5, and the coolant channel and the nozzle 28 are arranged to direct a coolant fluid towards the first and second nose portions 10, 10'.

Reference is now made to FIGS. 9-16 showing a third turning tool 1, comprising a first cutting insert 2. The principal differences compared to the first turning tool relates to the designs of the first cutting insert 2 and the insert seat 6.

In a top view as seen in FIG. 15, a first extension line 21 co-linear with the first cutting edge 11 and a second extension line 22 co-linear with the second cutting edge 12 extends on opposite sides relative to the first cutting insert center axis A2, which axis is co-linear with the rotational axis R1 and the longitudinal center axis A1 when the cutting insert 2 is mounted in the insert seat 6. The previous sentence is true also for the turning tool 1 according to the first embodiment.

The first cutting insert 2 comprises three nose portions 10, 10', 10". The first cutting insert 2 is 120° symmetrical in top and bottom views.

In a top view as seen in FIG. 15 the first and second cutting edges 11, 12 forms a nose angle α which is 35°.

Figure 12:
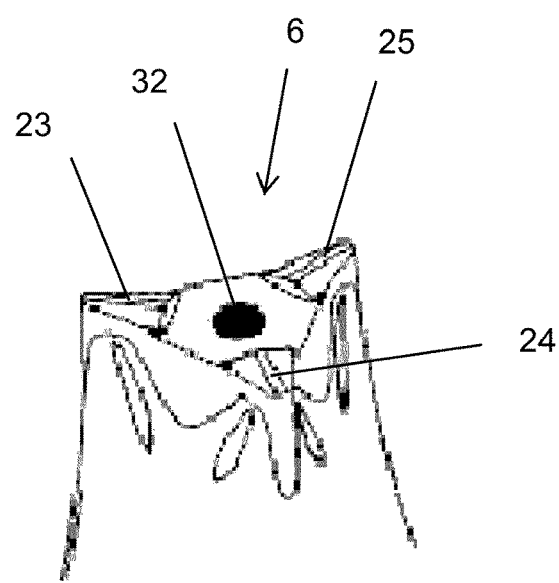
FIG. 12 is a perspective view of the insert seat of the tool body in FIG. 11.

As seen in FIG. 12, the first insert seat 6 comprises first insert seat rotational locking means comprising ridges 23-25, where said ridges 23-25 extend radially in relation to a hole 32 for the clamping screw 14 formed in the first insert seat 6.

The first cutting insert 2 comprises first cutting insert rotational locking means comprises grooves 16-18 formed in the bottom surface 8, co-operating with the first insert seat rotational locking means 23-26.

Reference is now made to FIG. 17-20, showing a fourth turning tool 1. The fourth turning tool 1 principally differs from the first turning tool in that the turning tool 1 comprises a second and a third cutting insert 29, 30, clamped our mounted in a second and third insert seat, respectively. Said second and third insert seats are formed in the intermediate portion 5 of the tool body 3 longitudinally between and spaced apart from the first cutting insert 2 and the coupling portion 4.

The second cutting insert 29 and the third cutting insert 30 is each different in shape in a top view compared to the first cutting insert 2. The third cutting insert 30 is a threading insert.

The second and third cutting insert 29, 30 each comprises nose portions, where each of said nose portions comprises a set of cutting edges.

Compared to the first cutting insert 2, the second and third cutting inserts 29, 30 are placed at a greater distance from the longitudinal center axis A1 of the intermediate portion 5.

Figures 19, 20:
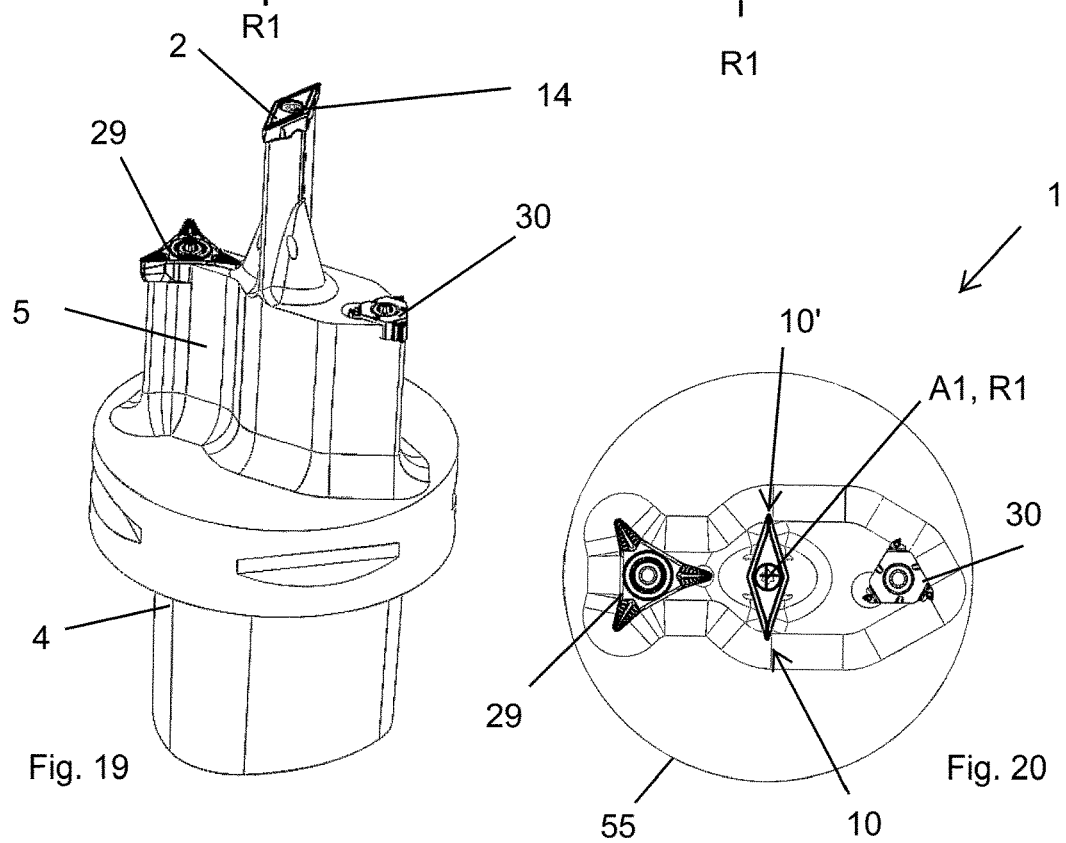
FIG. 19 is a perspective view of the turning tool in FIG. 17.
FIG. 20 is a top view of the turning tool in FIG. 17.

In a top view as seen in FIG. 20, the second and third cutting inserts 29, 30 forms equally large angles or substantially equally large angles in relation to the first and second nose portions. In FIG. 20, the first cutting insert comprise two nose portions 10, 10' which are placed at 6 o'clock and at 12 o'clock, respectively. The second cutting insert 29 is placed at 9 o'clock, and the third cutting insert 30 is placed at 9 o'clock, where the time references refers to an analogue 12-hour watch and relates to the relative position in relation to the longitudinal center axis A1. By such a turning tool, the clearance is further improved.

Figures 17, 18:
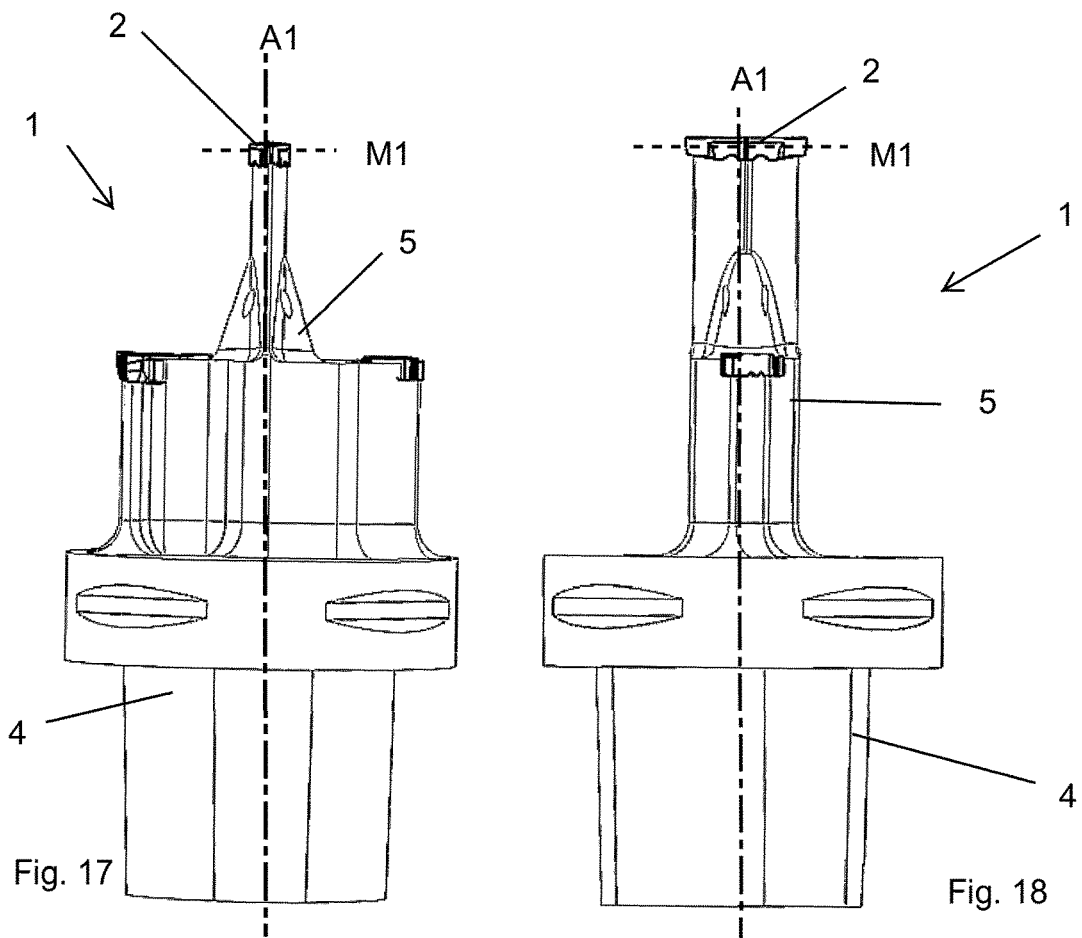
FIG. 17 is a side view of a fourth turning tool.
FIG. 18 is a further side view of the turning tool in FIG. 17.

As seen in FIG. 17, the second and third cutting inserts 29, 30 are positioned longitudinally at equal distances or substantially equal distances from the clamping portion 4.

Figures 6, 7:
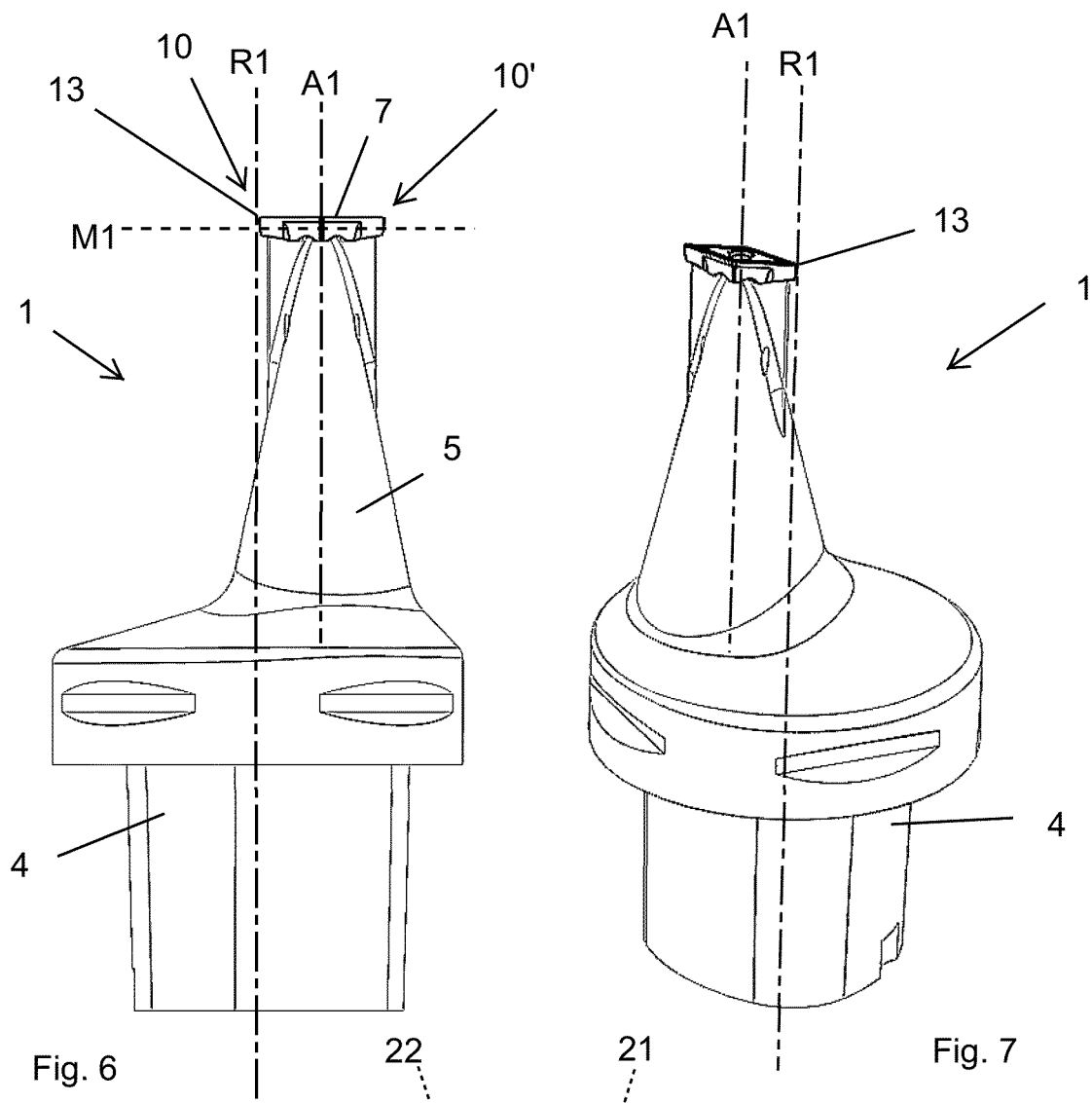
FIG. 6 is a side view of a second turning tool.
FIG. 7 is a perspective view of the turning tool in FIG. 6.

Reference is now made to FIG. 6-8, showing a second turning tool 1. The second turning tool 1 principally differs from the first turning tool in that for the second turning tool 1, the longitudinal center axis A1 is parallel to and spaced apart from the tool rotational axis R1, and the convex nose cutting edge 13 of the first nose portion 10 intersects or substantially intersects the tool rotational axis R1. In other words, the intermediate portion 5 is offset in relation to the tool rotational axis R1. A mid-point of the convex nose cutting edge 13 of the first nose portion 10 is positioned less than or equal to 0.5 mm from the tool rotational axis R1.

In other aspects, the second turning tool 1 is identical to or similar to the first turning tool. For example, in a top view as seen in FIG. 8 a first extension line 21 co-linear with the first cutting edge 11 and a second extension line 22 co-linear with the second cutting edge 12 extends on opposite sides relative to the longitudinal center axis A1 of the intermediate portion 5.

In accordance with the first, third and fourth embodiment, in a top view as seen in FIG. 8, the intermediate portion 5 and the first cutting insert 2 is inside an outer boundary line of the coupling portion 4.

Figures 21, 22:
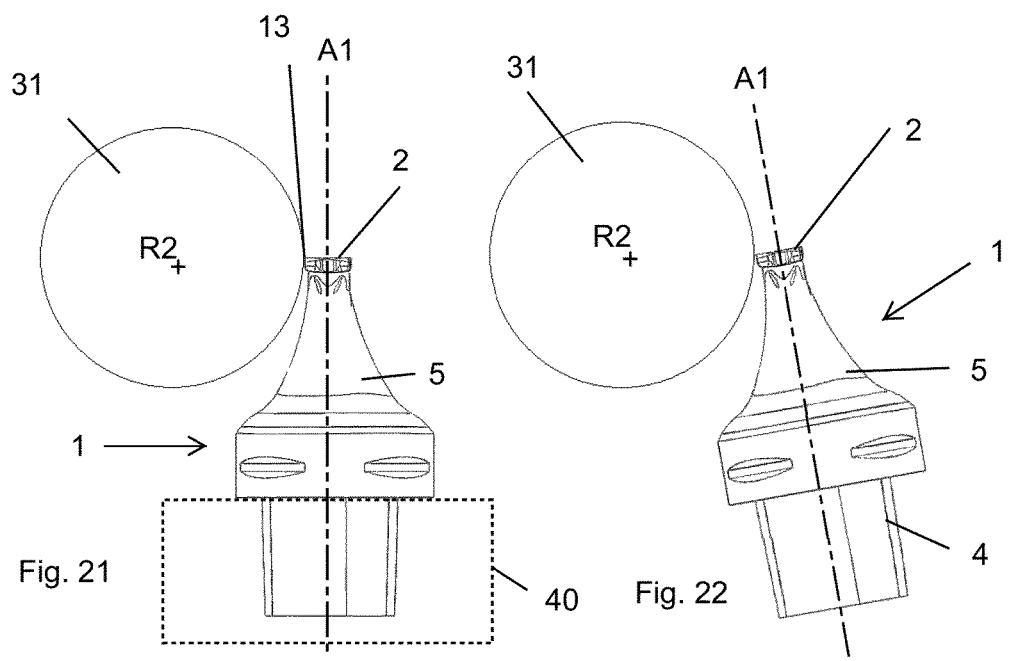
FIG. 21 is a side view of a first turning method using the turning tool in FIG. 9.
FIG. 22 is a side view of modified first turning method using the turning tool in FIG. 9.

Attention is now drawn to FIG. 21, showing in a side view the relative position and orientation of a metal work piece 31 and the third turning tool 1 when performing a first turning method. Alternatively, any other of the above described turning tools can be used. The turning tool 1 comprises a coupling portion 4 clamped to a machine interface 40 of a CNC-lathe (not shown), an intermediate portion 5 and a cutting portion 2 in the form of a cutting insert. The CNC-lathe (not shown) can be instructed to perform the turning method by instructions in a computer program, a computer readable medium or a data stream. A longitudinal center axis of the coupling portion 4 defines a tool rotational axis R1. The intermediate portion 5 extends along a longitudinal center axis A1 thereof. The cutting portion 2 comprises a top surface facing away from the coupling portion 4.

The metal work piece 31 rotates around a work piece rotational axis R2 in a clock-wise direction in FIG. 21.

The tool rotational axis R1 is perpendicular to the work piece rotational axis R2. The tool rotational axis R1 is arranged such that a tangent line of the metal work piece 31 at the point of contact with the convex nose cutting edge 13 intersect the coupling portion 4. The tangential cutting force is directed towards the machine interface 40. The tool rotational axis R1 is spaced apart by a distance from a peripheral surface of the metal work piece 31. The tool rotational axis R1 is parallel to said tangent line.

Attention is now drawn to FIG. 22, showing the relative position and orientation of a metal work piece 31 and the third turning tool 1 when performing an alternative of the first turning method. The arrangement in FIG. 22 differs from FIG. 21 only in that the tool rotational axis R1 is not parallel to said tangent line, but forms an angle less than or equal to 10° in relation to said tangent line.

Figures 23, 24:
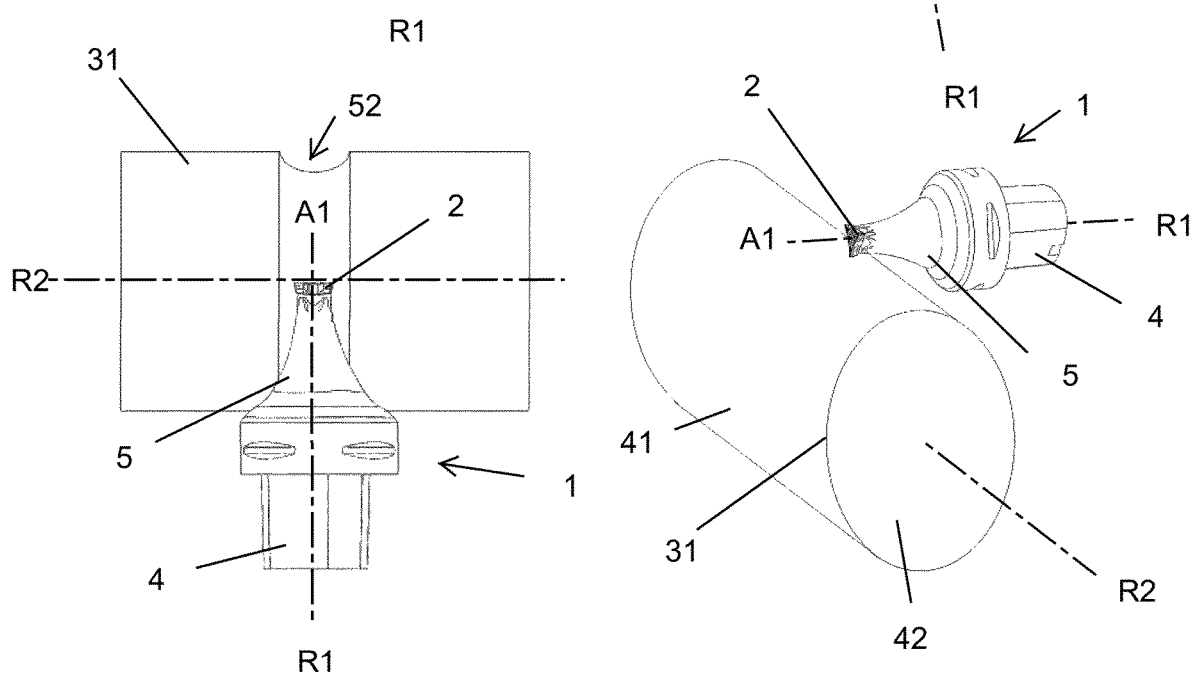
FIG. 23 is a second side view of FIG. 21.
FIG. 24 is a perspective view of the turning tool and metal work piece shown in FIG. 21.

Attention is now drawn to FIG. 23, showing a side view of the center position of the cutting insert 2, including the turning tool 1, during machining of a predetermined feature in the form of an external pocket or groove 52. The machining of the external groove 52 includes a non-linear, i.e. curved, first pass such that the first cutting edge is active and such that the second cutting edge is inactive, such that a first machined surface is generated by the convex nose cutting edge, and such that during at least a portion of the first pass, an entering angle and an angle which the first cutting edge forms in relation to the work piece rotational axis R2 simultaneously varies. The machining of the external groove includes a non-linear, i.e. curved, second pass where the second cutting edge is active, and the first cutting edge is inactive, and wherein at least a portion of the first machined surface is machined during the second pass, thereby generating a second machined surface by the convex nose cutting edge. Said first pass is generally towards the left-hand side and said second pass is generally towards the right-hand side in FIG. 23.

Attention is now drawn to FIG. 24, showing a perspective view of the arrangement shown in FIG. 21. The metal work piece 31 shown is cylindrical and comprises a lateral surface 31, i.e. a surface facing away from the work piece rotational axis R2, and a base surface 42, i.e. a surface facing in a direction parallel to the work piece rotational axis R2. The metal work piece 31 comprises a second base surface, facing away from the viewer. In the first turning method described above, machining is made in a lateral surface 41 of a metal work piece 31. In the third turning method shown in FIG. 27, machining is made in a base surface 42 of a metal work piece 31.

Figure 25:
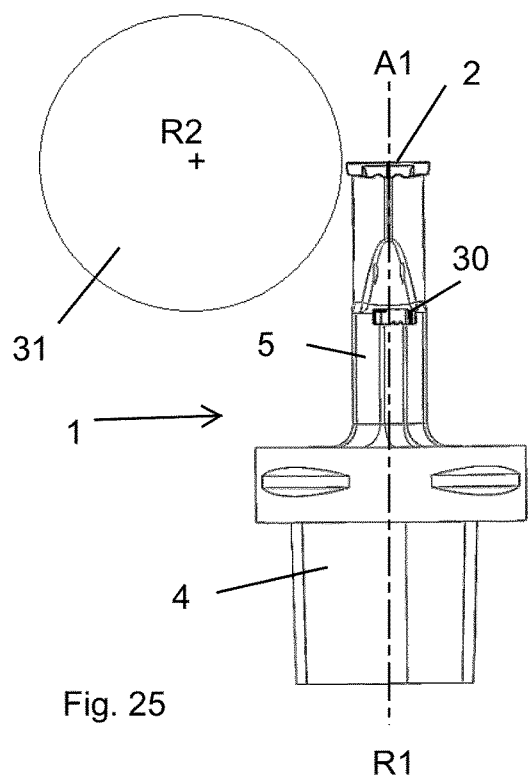
FIG. 25 is a side view of a second turning method using the turning tool in FIG. 17.
Figure 26:
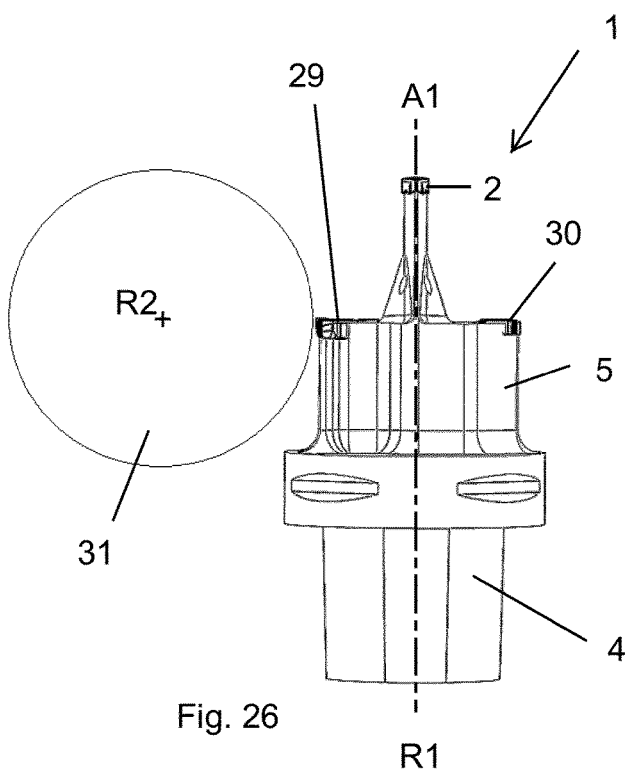
FIG. 26 is a further side view of the second turning method using the turning tool in FIG. 17.

Attention is now drawn to FIGS. 25 and 26, showing a second turning method using the fourth turning tool 1. The method includes using the first cutting insert 2, where the fourth turning tool 1 is in a position relative to the metal work piece 31 as shown in FIG. 25. The second turning method comprises the step of machining using the first turning insert 2 according to any of the above or below described turning methods. The second turning method further comprises the steps of withdrawing the turning tool 1 from the metal work piece 31 and moving the turning tool 1 in a forward direction along the tool rotational axis R1 to the position shown in FIG. 26. The method further comprises the step of rotating the turning tool 1 around the tool rotational axis R1 by a predetermined angle, such that the second cutting insert 29 is in an active position. Said predetermined angle is within the range of 80°-100°.

Figure 27:
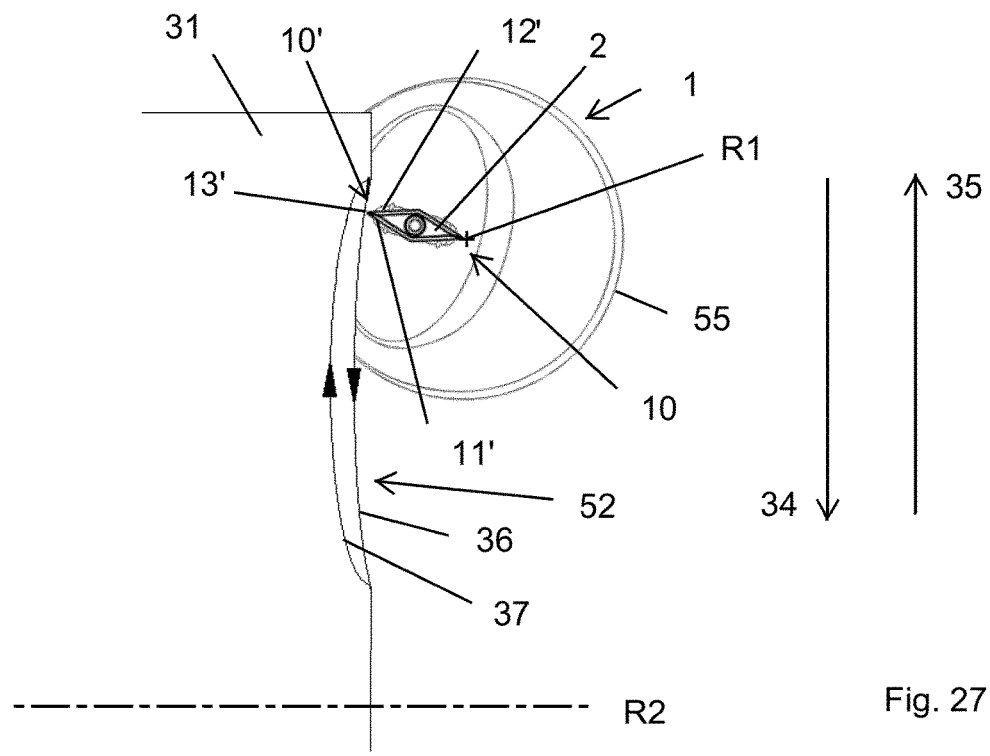
FIG. 27 is a side view of a third turning method using the turning tool in FIG. 6.
Figure 28:
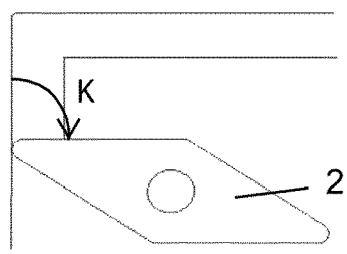
FIGS. 28-37 are illustrations of a fourth turning method.

Reference is now made to FIG. 27, showing a turning method using the second turning tool 1, although any of the above or below described turning tools may be used. A metal work piece 31 is provided, which rotates around a work piece rotational axis R2. The tool rotational axis R1 is perpendicular to the work piece rotational axis R2. The machining or turning method is made at a base surface or end face of the metal work piece 31.

The tool rotational axis R1 is perpendicular to the work piece rotational axis R2. In the example, both the work piece rotational axis R2 and the tool rotational axis R1 is in a horizontal position. One possible alternative is to arrange both the work piece rotational axis R2 and the tool rotational axis R1 in a vertical position.

The cutting insert 2 comprises first and second nose portions 10, 10'. In the method in FIG. 27, the second nose portion 10' is in an active position. The method can alternatively be performed where the first nose portion 10 is in an active position. In such case, the turning tool 1 is 180° rotated around the tool rotational axis R1.

The method comprises the step of making a first pass 36 by moving the turning tool such that the first cutting edge 11' is active, such that the second cutting edge 12' is inactive, and such that a machined surface is formed by the nose cutting edge 13'.

The method comprises the step of making a second pass 37 by moving the turning tool such that the first cutting edge 11' is inactive, such that the second cutting edge 12' is active, and such that at least a portion of a machined surface from the first pass 37 is machined.

Figure 34:
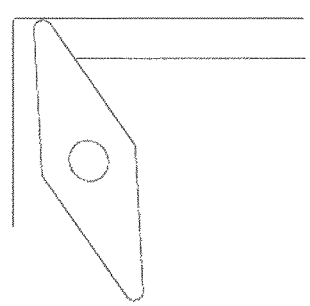
Figure 35:
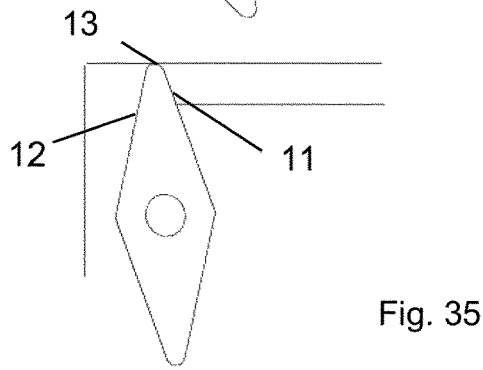
Figure 36:
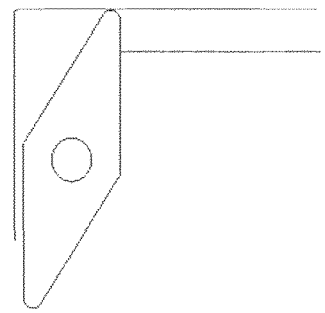
Figure 37:
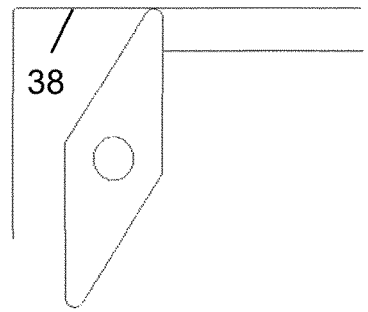

During the first pass the turning tool rotates in a first direction, counter-clockwise in FIG. 34, around the tool rotational axis R1.

During the second pass 37 the turning tool rotates in a second direction around the tool rotational axis, where said second direction, clock-wise in FIG. 27, is opposite to said first direction.

During the first pass 36 the turning tool is moved along non-linear or curved path. The first pass comprises a radial component 34 which is perpendicular to and towards the work piece rotational axis R2, downwards in FIG. 27.

During the second pass 37 the turning tool is moved along a path which is non-linear or curved. The second pass comprises a radial component 35 which is perpendicular to and away from the work piece rotational axis R2, upwards in FIG. 27, i.e. opposite to the radial component 34 of the first pass.

During the at least a portion of said first and second passes 36, 37, respectively, an entering angle and an angle which the first cutting edge forms in relation to the work piece rotational axis R2 simultaneously varies.

After the first pass 36 but prior to the second pass 37, the turning tool is withdrawn from the metal work piece 31.

Figure 32:
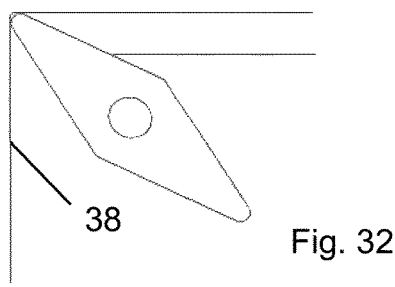
Figure 33:
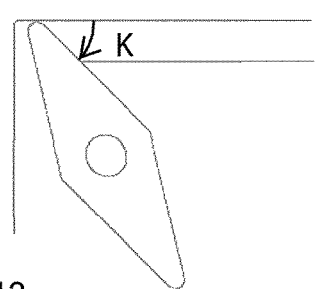

Attention is now drawn to FIGS. 28-37. A cutting portion 2 in the form of a cutting insert 2 is shown. The remaining parts of the turning tool is not shown. A turning tool as described as the first, second, fourth or fifth turning tool may be used. FIGS. 28-37 show a sequence or steps of a turning method, which together form a first pass. The figures are in chronological order. The cutting insert 2 is in FIGS. 28-31 moved upwards in the figures, i.e. towards the work piece rotational axis R2, i.e. a radial motion. The cutting insert 2 is in FIGS. 33-37 moved to the right-hand side in the figures, i.e. substantially parallel to the work piece rotational axis R2, i.e. a longitudinal motion. FIG. 32 shows the end of the radial motion, and the start of the longitudinal motion. The machining sequence illustrate a non-linear first pass where a first machined surface 38 is generated by the convex nose cutting edge 13 and where the first cutting edge 11 is active. The tool rotational axis (not shown) is directed or orientated towards the viewer, in other words, the tool rotational axis is perpendicular to or substantially perpendicular to the work piece rotational axis R2.

During the at least a portion of said first pass, an entering angle K and an angle β which the first cutting edge forms in relation to the work piece rotational axis R2 simultaneously varies.

Figure 29:
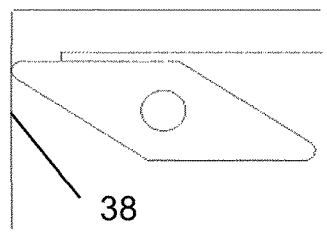
Figure 30:
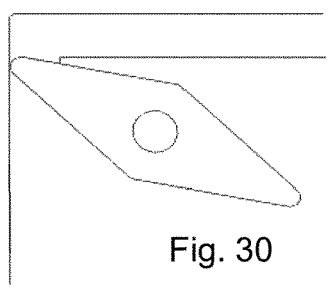
Figure 31:
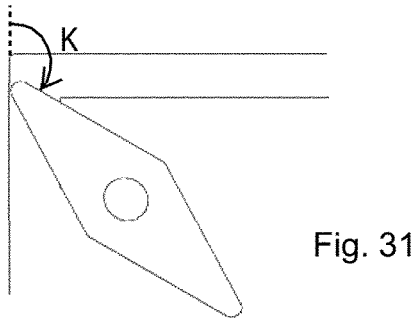
Figure 38:
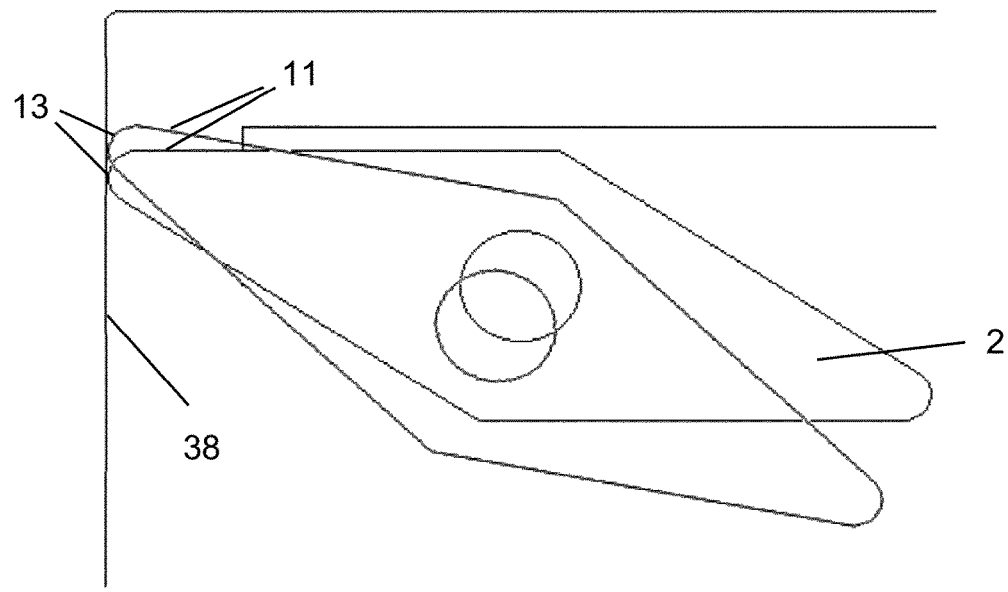
FIG. 38 is showing FIGS. 29 and 30 combined.

FIG. 38 show FIGS. 29 and 30 together, where FIG. 30 show the position of the turning insert 2 in a position after the metal work piece has made one revolution around the rotational axis thereof from the turning insert 2 position of FIG. 29. It can be seen that the entering angle increases as the surface generating nose cutting edge 13 of the turning insert 2 is moved forward. Between FIGS. 29 and 30, the movement of the surface generating point 56 of the nose cutting edge 13 is linear, towards the rotational axis R2. The surface generating feed rate (per revolution) is, at least approximately, the distance between the respective surface generating points 56 of the nose cutting edge 13 in FIGS. 29 and 30.

Figure 39:
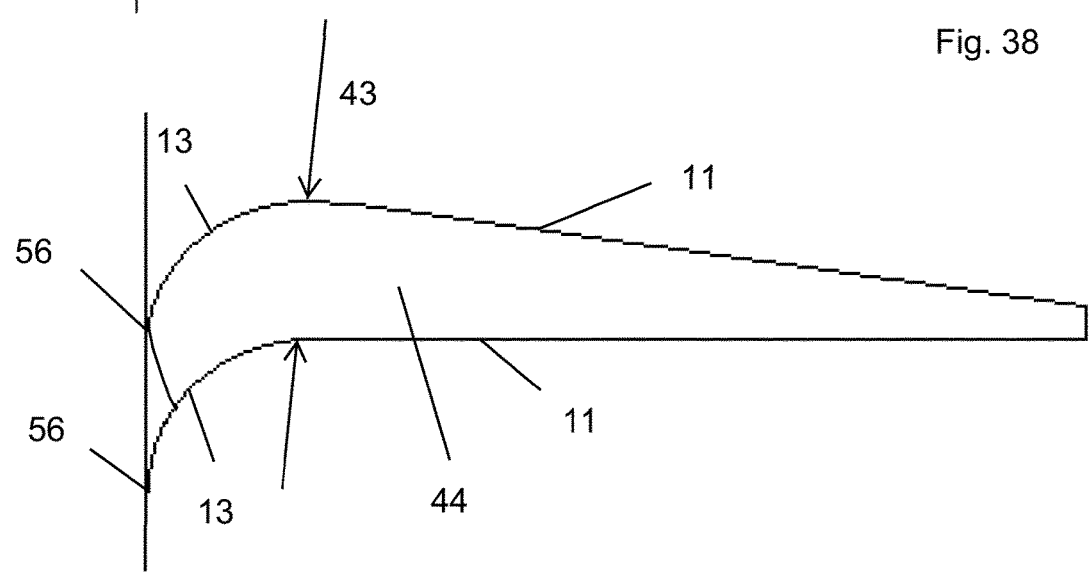
FIG. 39 is an enlarged view of a portion of FIG. 38.
Figure 44:
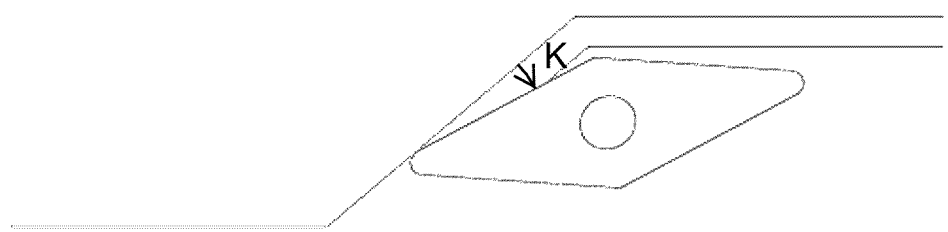
Figure 45:
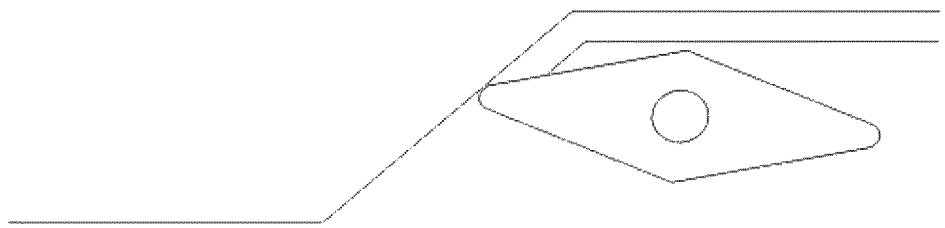
Figure 46:
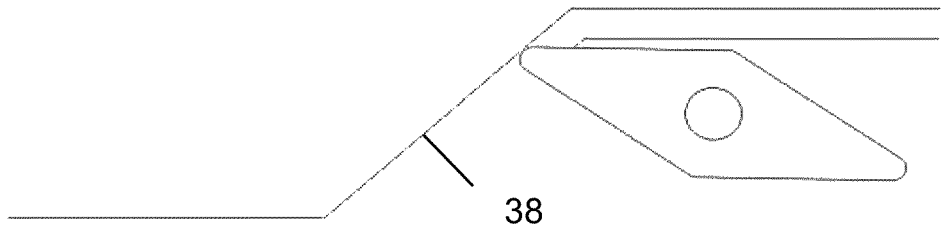
Figure 47:
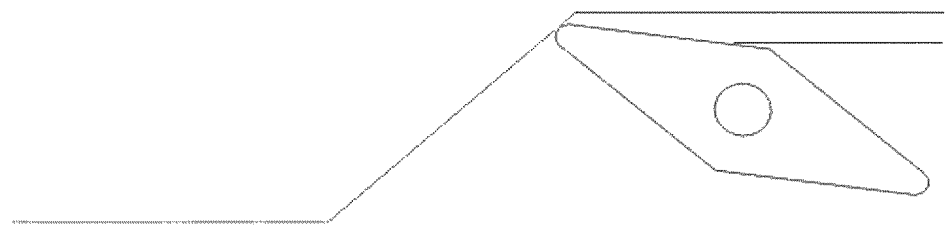

FIG. 39 show a section of FIG. 38. The chip area 44 is a representation of the area of material removed per revolution. The chip area 44 can at least theoretically be understood as a cross section of a chip removed during the turning process. As can be seen the chip area 44 is not uniform.

When the entering angle K varies, the maximum chip thickness $h_x$ is the maximum chip thickness measured along a line perpendicular to the first cutting edge 11.

When the entering angle K varies, the distance which the surface generating point 56 of the nose cutting edge 13 moves per revolution can be designated as the feed rate per revolution. Said feed rate per revolution in this case, when the entering angle K varies, can be designated as the surface generating feed rate, and can be fined as the distance which the surface generating point 56 of the nose cutting edge moves per revolution of the metal work piece.

The maximum chip thickness 43 is preferably set to a constant predetermined value or to be within a predetermined range during at least a portion of the first pass 36.

Figure 48:
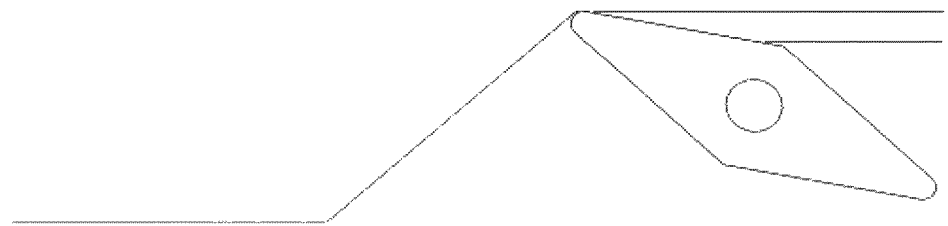
Figure 49:
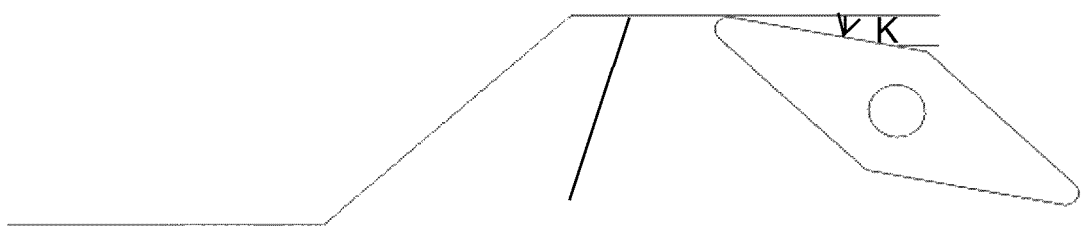

Attention is now drawn to FIGS. 40-49. A cutting portion 2 in the form of a cutting insert 2 is shown. The remaining parts of the turning tool is not shown. A turning tool as described as the first, second, fourth or fifth turning tool may be used. FIGS. 28-37 show a sequence or steps of a sequence of a turning method, which together form a first pass. The figures are in chronological order. The cutting insert 2 is in FIGS. 40-41 and 48-49 is moved to the right-hand side in the figures, i.e. substantially parallel to the work piece rotational axis R2, i.e. a longitudinal motion. FIGS. 40-41 show a first longitudinal motion, and FIGS. 48-49 show a second longitudinal motion, at a smaller diameter than the first longitudinal motion. FIGS. 42-48 show a profiling motion where the cutting insert is moved at an angle in relation to the work piece rotational axis R2, towards the right-hand side in the figures and towards the work piece rotational axis R2. FIG. 48 show the end position of the cutting insert 2 in the profiling motion, which is also the start position of the cutting insert 2 in the second longitudinal motion.

During the at least a portion of said first pass, an entering angle K and an angle β which the first cutting edge forms in relation to the work piece rotational axis R2 simultaneously varies.

Figure 50:
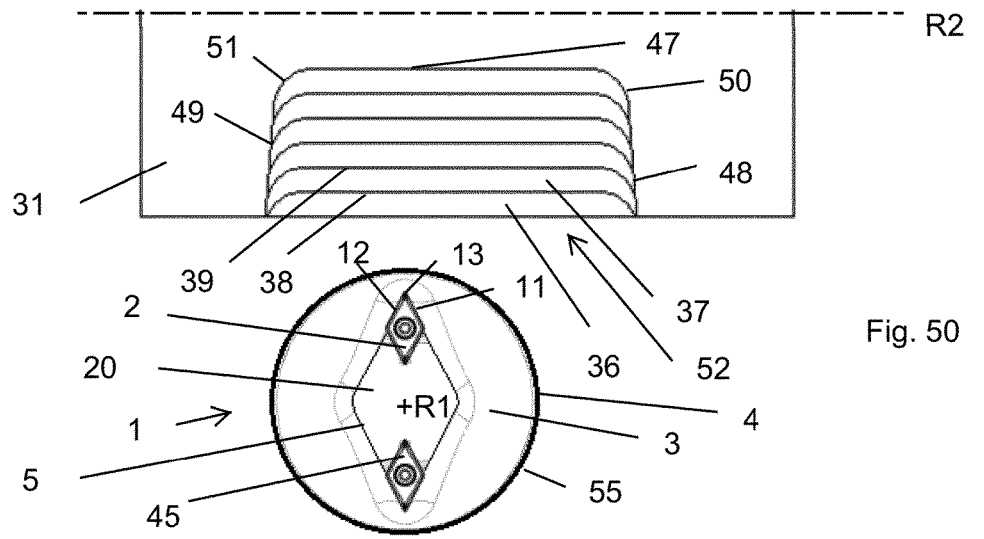
FIG. 50 is a sixth turning method.

Attention is now drawn to FIG. 50. The fifth turning tool 1 is shown. The turning tool 1 comprises a first cutting insert 2, a second cutting insert 3, and a tool body 3. The tool body 3 comprises a coupling portion 4, an intermediate portion 5, and insert seats in which insert seats the first and second cutting inserts are mounted. A longitudinal center axis of the coupling portion 4 defines a tool rotational axis R1, around which tool rotational axis R1 the turning tool 1 is rotatable. Top surfaces of the respective first and second cutting inserts 2, 45 are facing away from the coupling portion 4. A metal work piece 31 is rotatable around a work piece rotational axis R2. The tool rotational axis R1 is perpendicular to the work piece rotational axis R2. The turning tool 1 is used to machine a predefined feature in the form of an external groove 52. The external groove 52 opens in a direction away from the work piece rotational axis R2. The groove 52 is limited by a first side wall 48, a second side wall 49, a bottom surface 47, a first corner surface 50 and a second corner surface 51. The first corner surface 50 is connecting the bottom surface 47 and the first side wall 48. The second corner surface 51 is connecting the bottom surface 47 and the second side wall 49. The machining of the groove 52 includes a sequence of non-linear passes, where a sequence of machined surfaces is generated by the nose cutting edge 13 of the first cutting insert 2. The passes of the machining sequence include machining alternatively in longitudinally substantially opposite directions, in other words alternatively substantially towards the right-hand side, where the first cutting edge 11 is active, and alternatively towards the left-hand side, where the second cutting edge 12 is active.

The machining sequence includes a first non-linear pass 36 where a first machined surface 38 is generated by the convex nose cutting edge 13, and where the first cutting edge 11 is active. The first non-linear pass 36 is followed by a second non-linear pass 37 where a second machined surface 39 is generated by the nose cutting edge 13, and where the second cutting edge 12 is active.

Figure 51:
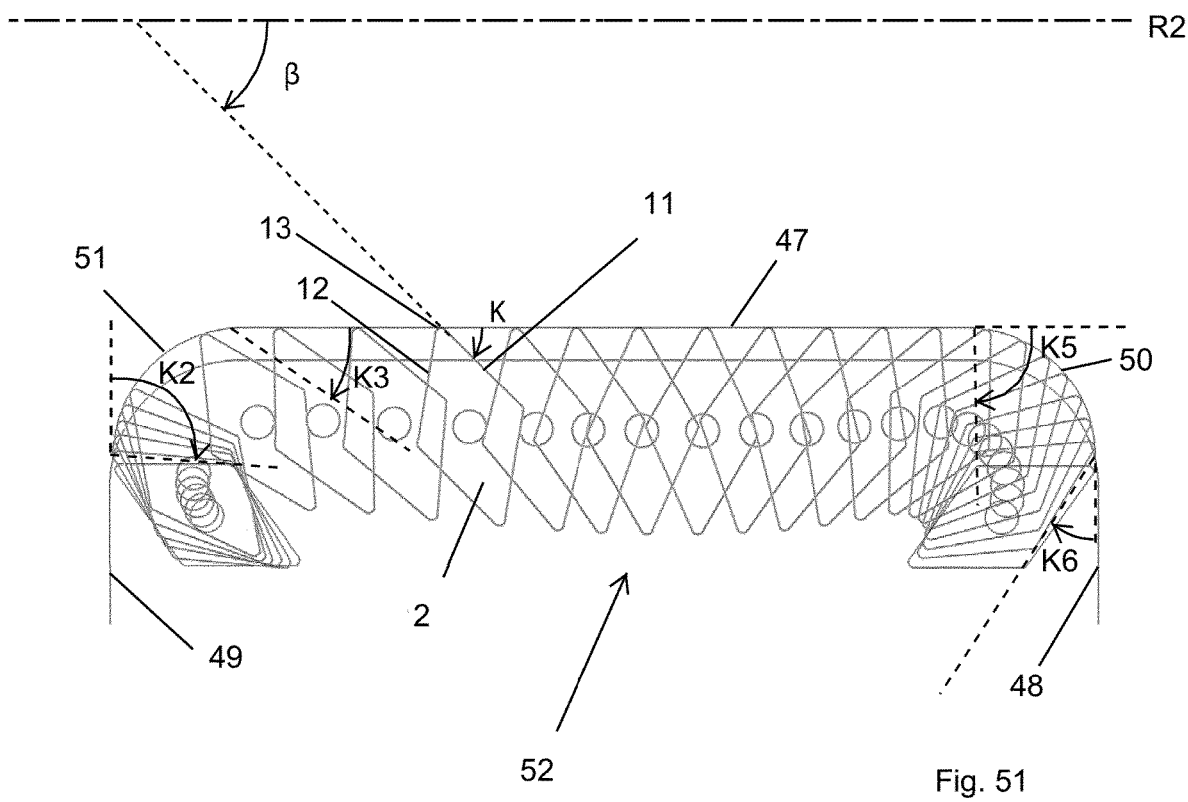
FIG. 51 is a seventh turning method.

Attention is now drawn to FIG. 51. An external groove 52 is machined by a turning tool (not shown) comprising a first cutting insert 2. A turning tool as described as the first, second, fourth or fifth turning tool may be used. Multiple positions of the first cutting insert 2 during a non-linear first pass is shown, where the first cutting insert 2 is moved towards the right-hand side. The groove 52 is limited by a first side wall 48, a second side wall 49, a bottom surface 47, a first corner surface 50 and a second corner surface 51. The first corner surface 50 is connecting the bottom surface 47 and the first side wall 48. The second corner surface 51 is connecting the bottom surface 47 and the second side wall 49. The bottom surface 47 is a cylindrical surface concentric with the work piece rotational axis R2.

During the non-linear first pass, the first cutting edge 11 is active and the second cutting edge 12 is inactive. A first machined surface 38 is generated by the convex nose cutting edge 13. During at least a portion of the first pass 36, an entering angle K and an angle β which the first cutting edge 11 forms in relation to the work piece rotational axis R2 simultaneously varies.

The turning method comprises the steps of setting a second corner surface corner surface 51 entering angle $K_2$, a second corner surface 51 exit entering angle $K_3$, a bottom surface 47 longitudinal exit entering angle $K_5$, and an entering angle $K_6$ at the exit of the first corner surface 50.

The non-linear first pass may be such that the nose cutting edge 13 and/or first cutting edge 11 goes into cut prior to the second corner surface 51. In such a case, an entry entering angle is designated $K_1$ (not shown). In a similar manner, the non-linear first pass may be such that the nose cutting edge 13 and/or first cutting edge 11 goes out of cut after the first corner surface 50.

The corner entering angle $K_2$ is greater than the corner exit entering angle $K_3$. The longitudinal exit entering angle $K_5$ is greater than the corner exit entering angle $K_3$.

The corner entering angle $K_2$ is set to 60-120°, even more preferably 80-110°. Preferably, the corner exit entering angle $K_3$ is set to 20-80°, even more preferably 25-45°. Preferably, the longitudinal exit entering angle $K_5$ is set to 60-120°, even more preferably 80-110°.

$K_6$ is preferably set to 10-80°, even more preferably 25-45°.

During the first non-linear pass, the entering angle K is preferably continuously, i.e. without steps, i.e. step-less, varied during at least a portion of the non-linear first pass. Alternatively, the entering angle K is incrementally varied, preferably in steps of less than 2°.

During the first non-linear pass, the rotation of the turning tool around a tool rotational axis is in one direction only, clock-wise when seen as in FIG. 51, where a coupling portion is away from the viewer.

Figure 52:
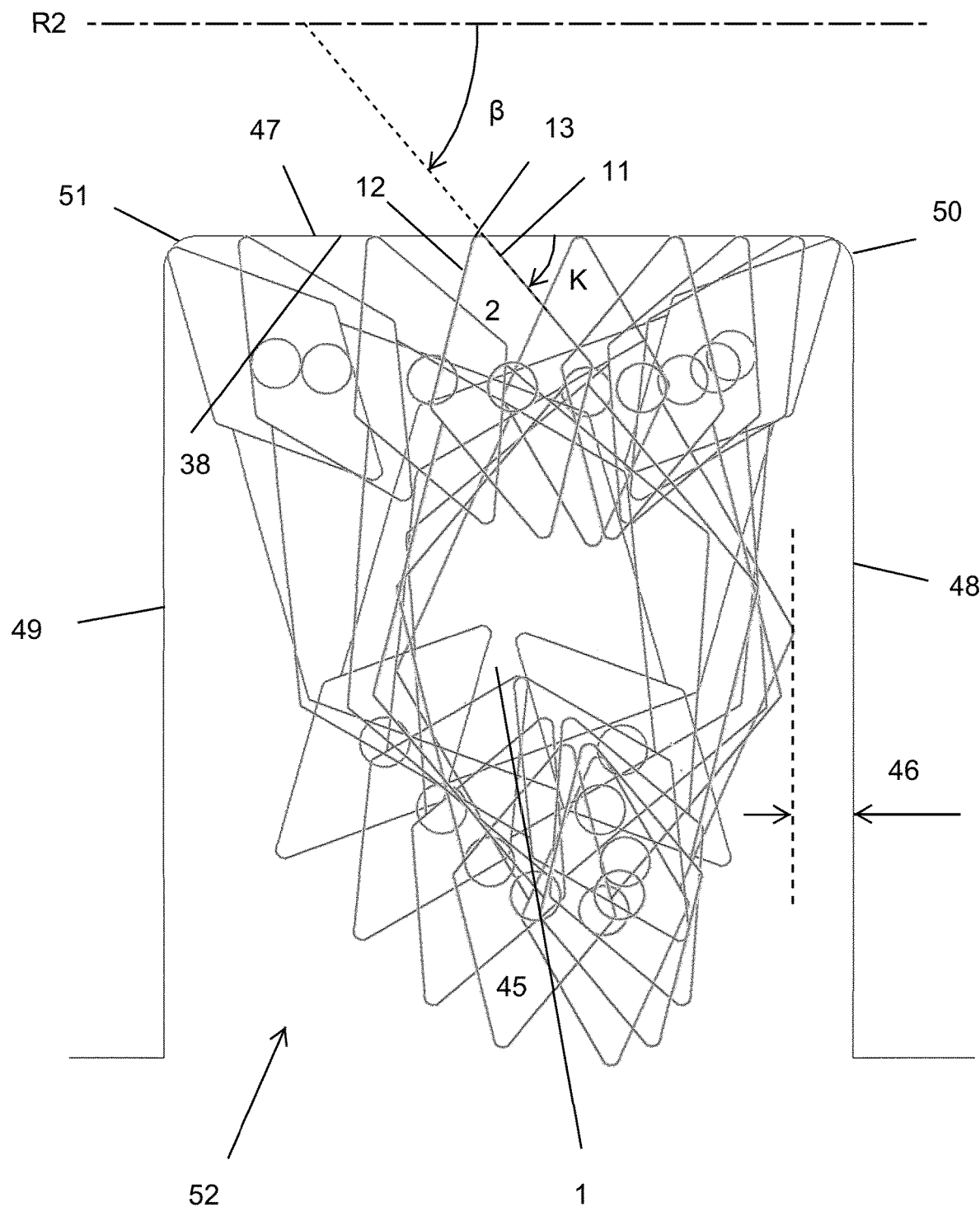
FIG. 52 is an eight turning method using the fifth turning tool.

Attention is now drawn to FIG. 52. An external groove 52 is machined by the fifth turning tool 1 comprising a first cutting insert 2 and a second cutting insert 45. Multiple positions of the first turning tool 1 during a non-linear first pass is shown, where the turning tool 1 is moved towards the right-hand side. The groove 52 is limited by a first side wall 48, a second side wall 49, a bottom surface 47, a first corner surface 50 and a second corner surface 51. The first corner surface 50 is connecting the bottom surface 47 and the first side wall 48. The second corner surface 51 is connecting the bottom surface 47 and the second side wall 49. The bottom surface 47 is a cylindrical surface concentric with the work piece rotational axis R2.

During the non-linear first pass, the first cutting edge 11 of the first cutting insert 2 is active and the second cutting edge 12 is inactive. The second cutting insert 45 is inactive. A first machined surface 38 is generated by the convex nose cutting edge 13. The nose cutting edge 13 is moved towards the first corner surface 50. During at least a portion of the first pass 36, an entering angle K and an angle β which the first cutting edge 11 forms in relation to the work piece rotational axis R2 simultaneously varies. The turning method comprises the step of increasing a speed of rotation of the turning tool 1 around the tool rotational axis (not shown) as a portion of the turning tool 1, spaced apart from the first cutting insert 2, reaches a predetermined distance 46 from the first side wall 48. Thus, the risk of collision can be reduced. The entering angle K is increased during at least a portion of the first pass 36.

During the first non-linear pass, the rotation of the turning tool around a tool rotational axis is in one direction only, clock-wise when seen as in FIG. 51, where a coupling portion is away from the viewer.

Attention is now drawn to FIGS. 53-58. An external groove 52 is machined by the fifth turning tool 1 comprising a first cutting insert 2 and a second cutting insert 45. The positions of the first turning tool 1 during a portion of a non-linear first pass is shown in chronological order in FIGS. 53-56. The turning tool 1 is moved generally towards the right-hand side in FIGS. 53-56, followed by a general movement downwards in FIGS. 56-58. The groove 52 is limited by a first side wall 48, a second side wall 49, a bottom surface 47, a first corner surface 50 and a second corner surface 51. The first corner surface 50 is connecting the bottom surface 47 and the first side wall 48. The second corner surface 51 is connecting the bottom surface 47 and the second side wall 49. The bottom surface 47 is a cylindrical surface concentric with the work piece rotational axis R2.

During the non-linear first pass, the first cutting edge 11 of the first cutting insert 2 is active and the second cutting edge 12 is inactive. The second cutting insert 45 is inactive. A first machined surface 38 is generated solely by the convex nose cutting edge 13. The nose cutting edge 13 is moved towards the first corner surface 50. During at least a portion of the first pass 36, an entering angle K and an angle β which the first cutting edge 11 forms in relation to the work piece rotational axis R2 simultaneously varies. The turning method comprises the step of increasing a speed of rotation of the turning tool 1 around the tool rotational axis, co-linear with a longitudinal center axis A1 of an intermediate portion 5 of a tool body of the turning tool 1, as a portion of the turning tool 1, spaced apart from the first cutting insert 2, reaches a predetermined distance 46 from the first side wall 48. Thus, the risk of collision can be reduced. The entering angle K is increased during at least a portion of the first pass 36.

During the machining of the bottom surface 47, the entering angle K and the angle β which the first cutting edge 11 forms in relation to the work piece rotational axis R2 have the same value. During the machining of at least a portion of the first corner surface 50, as seen in FIG. 56, said angles have different values.

Attention is now drawn to FIGS. 59-62, showing a fifth turning tool 1 which is particularly suitable for any of the above described turning methods. The fifth turning tool 1 comprises a tool body 3, a first cutting insert 2 and a second cutting insert 45. The tool body 3 comprises a coupling portion 4, an intermediate portion 5, a first insert seat 6 for the first cutting insert 2 and a second insert seat for the second cutting insert 45. The tool body 3 extends between the coupling portion 4 and a front end 20 of the tool body 3. The front end of the tool body 3 comprises the first insert seat 6 and the second insert seat. The first cutting insert 2 comprises a bottom surface 8 opposite a top surface 7, and a side surface 9 which connects the top and bottom surfaces 7, 8. A mid-plane M1 extends mid-way between the top and bottom surfaces 7, 8. The top surface 7 of the first cutting insert 2 is facing away from the coupling portion 4. The second cutting insert 45 comprises a bottom surface 8' opposite a top surface 7', and a side surface 9' which connects the top and bottom surfaces 7', 8'. A mid-plane M1' extends mid-way between the top and bottom surfaces 7', 8'. The top surface 7' of the second cutting insert 45 is facing away from the coupling portion 4. A longitudinal center axis R1 of the coupling portion 4 defines a tool rotational axis R1. The intermediate portion 5 extends along a longitudinal center axis A1 thereof. In a top view as seen in FIG. 62, a greatest distance 52 between the first and second cutting inserts 2, 45 is greater than a width 53 of the front end 20 of the tool body 3, where said width 53 of the front end 20 of the tool body 3 is measured perpendicular to said greatest distance 52 between the first and second cutting inserts 2, 45. As seen in FIG. 61, a length 54 of the intermediate portion 5, measured along the longitudinal center axis A1 is greater than the greatest distance 52 between the first and second cutting inserts 2, 45.

Each top surface 7, 7' of the first and second cutting inserts 2, 45 comprises chip breaking means or chip breakers, preferably in the form of one or more protrusions and/or depressions. In FIGS. 59-64, the cutting inserts both have a rhombic shape in a top view. However, the first and second cutting inserts does not have to have a corresponding shape. Further, in top view, the first and second inserts may have any shape. The coupling portion 4 of the fifth turning tool 1, and of the second, third and fourth turning tool, is in accordance with the coupling portion 4 of the first turning tool 1.

In the present application, the use of terms such as "including" is open-ended and is intended to have the same meaning as terms such as "comprises" and "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such. Terms such as "upper", "upwards", "lower", "top", "bottom", "forward", "right", "left", "front" and "rear" refer to objects as shown in the current drawings and as perceived by the skilled person.

The invention claimed is:

1. A turning method for a computerized numerical control lathe comprising the steps of:
    providing a turning tool including a cutting portion, the cutting portion having a first nose portion, the first nose portion including a first cutting edge, a second cutting edge, and a convex nose cutting edge connecting the first and second cutting edges, wherein the first and second cutting edges are straight or substantially straight in a top view;
    providing a metal work piece;
    rotating the metal work piece around a work piece rotational axis; and
    making a first pass such that the first cutting edge is active and the second cutting edge is inactive, wherein a first machined surface is generated by the convex nose cutting edge, and such that during at least a portion of the first pass, an entering angle and an angle, which the first cutting edge forms in relation to the work piece rotational axis, simultaneously varies.

2. The turning method according to claim 1, wherein the first pass is a non-linear first pass.

3. The turning method according to claim 1, further comprising the step of, during at least a portion of the first pass, increasing the entering angle and reducing a surface generating feed rate.

4. The turning method according to claim 1, wherein the entering angle and the angle, which the first cutting edge forms in relation to the work piece rotational axis, continuously varies.

5. The turning method according to claim 1, wherein the entering angle and the angle, which the first cutting edge forms in relation to the work piece rotational axis, varies by a rotation of the turning tool around a tool rotational axis, wherein the tool rotational axis is perpendicular to or substantially perpendicular to the work piece rotational axis.

6. The turning method according to claim 5, further comprising the step of, during at least a portion of the first pass, moving the tool rotational axis in relation to the work piece rotational axis.

7. The turning method according to claim 1, further comprising the step of, during at least a portion of the first pass, moving the turning tool towards the work piece rotational axis.

8. The turning method according to claim 2, wherein the entering angle and the angle, which the first cutting edge forms in relation to the work piece rotational axis, varies during a non-linear portion of the non-linear first pass.

9. The turning method according to claim 1, further comprising the step of setting a maximum chip thickness to a constant predetermined value or to be within a predetermined range during at least a portion of the first pass.

10. The turning method according to claim 2, wherein the cutting portion is in the form of a cutting insert, wherein the first non-linear pass includes machining of a bottom surface of an external groove, wherein the groove is limited by a first side wall, a second side wall, the bottom surface, a first corner surface and a second corner surface, wherein the first corner surface is connected to the bottom surface and the first side wall, wherein the second corner surface is connected to the bottom surface and the second side wall, the method further comprising the steps of moving the nose cutting edge towards the first corner surface and increasing a speed of rotation of the turning tool around a tool rotational axis as a portion of the turning tool, spaced apart from the cutting insert, reaches a predetermined distance from the first side wall.

11. The turning method according to claim 1, further comprising the step of during, at least a portion of the first pass, setting a chip area to be below a predetermined value or to be within a predetermined range.

12. The turning method according to claim 1, further comprising the step of setting a maximum chip width to a predetermined value or to a predetermined range during at least a portion of the first pass.

13. The turning method according to claim 1, further comprising the step of making a second pass such that the second cutting edge is active and the first cutting edge is inactive, wherein at least a portion of the first machined surface is machined during the second pass, thereby generating a second machined surface by the convex nose cutting edge.

14. The turning method according to claim 1, wherein the cutting portion is in the form of a cutting insert, the cutting insert including a top surface, wherein in a top view an angle between the first cutting edge and the second cutting edge is less than 90°, and wherein in the top view, the convex nose cutting edge has a radius of curvature which is 0.15-1.3 mm, wherein the turning tool includes a tool body, the tool body having a coupling portion, an intermediate portion, and an insert seat, wherein the intermediate portion extends along a longitudinal center axis thereof, wherein the cutting insert is mounted in the insert seat, wherein the tool body extends between the coupling portion and a front end of the tool body, the front end of the tool body includes the insert seat, wherein the top surface of the cutting insert is facing away from the coupling portion, wherein a longitudinal center axis of the coupling portion defines a tool rotational axis, wherein the entering angle and the angle, which the first cutting edge forms in relation to the work piece rotational axis varies during the first pass as a result of a rotation of the turning tool around the tool rotational axis.

15. The turning method according to claim 14, wherein in the top view, the intermediate portion is at least 50% more elongated along a bisector formed between the first and second cutting edges than along a line, which is perpendicular to the bisector and intersects the longitudinal center axis of the intermediate portion.

16. A computer program having computer executable code, which when executed by a computer numerical control lathe causes the computer numerical control lathe to perform the method according to claim 1.

\* \* \* \* \*